(12) United States Patent
Gerson

(10) Patent No.: US 10,650,429 B2
(45) Date of Patent: May 12, 2020

(54) KNITTED TEXTILE METHODS AND SYSTEMS

(71) Applicant: Garrett Gerson, Malibu, CA (US)

(72) Inventor: Garrett Gerson, Malibu, CA (US)

( * ) Notice: Subject to any disclaimer, the term of this patent is extended or adjusted under 35 U.S.C. 154(b) by 337 days.

(21) Appl. No.: 15/831,296

(22) Filed: Dec. 4, 2017

(65) Prior Publication Data

US 2018/0130112 A1     May 10, 2018

Related U.S. Application Data

(63) Continuation-in-part of application No. 15/344,535, filed on Nov. 6, 2016, now Pat. No. 9,858,606.

(51) Int. Cl.

| | |
|---|---|
| *G06Q 30/00* | (2012.01) |
| *G06Q 30/06* | (2012.01) |
| *D04B 15/68* | (2006.01) |
| *G06Q 10/08* | (2012.01) |
| *D04B 15/76* | (2006.01) |
| *D04B 37/02* | (2006.01) |

(52) U.S. Cl.
CPC ......... *G06Q 30/0621* (2013.01); *D04B 15/68* (2013.01); *D04B 15/76* (2013.01); *D04B 37/02* (2013.01); *G06Q 10/0833* (2013.01); *G06Q 30/0633* (2013.01); *G06Q 30/0643* (2013.01)

(58) Field of Classification Search
CPC .................................................. G06Q 30/06–08
USPC ............................................... 705/26.1–27.2
See application file for complete search history.

(56) References Cited

U.S. PATENT DOCUMENTS

| | | | |
|---|---|---|---|
| 7,338,709 B1 | 3/2008 | Wada et al. | |
| 9,858,606 B1 * | 1/2018 | Mar ...................... | D04B 37/02 |
| 2002/0099583 A1 | 7/2002 | Matusek et al. | |
| 2013/0151382 A1 | 6/2013 | Fuller | |
| 2014/0040041 A1 | 2/2014 | Ohnemus et al. | |
| 2014/0277683 A1 * | 9/2014 | Gupta ..................... | G06F 17/50 |
| | | | 700/132 |

OTHER PUBLICATIONS

International Search Report and Written Opinion dated Jul. 16, 2018, from the ISA/US, for International Patent Application No. PCT/US18/00100 (filed Mar. 16, 2018), 9 pages.

* cited by examiner

*Primary Examiner* — Ethan D Civan
(74) *Attorney, Agent, or Firm* — Ascenda Law Group, PC

(57) ABSTRACT

An apparatus including at least one variation order processing server is configured to include at least one communication device coupled to at least one knitted textile consumer variation website, at least one production variation instruction data converter processor, at least one variation adapted knitting machine integrated control systems, at least one order tracking processor, at least one internet communication device, a thermal scanner, and at least one integrated control systems adaptation device, and at least one integrated knitted textiles variation ecommerce web application is configured to be coupled to at least one consumer internet communication device for communicating with the at least one knitted textile consumer variation website.

20 Claims, 23 Drawing Sheets

FIG. 10A

FIG. 10B 1620  1622  1624
ACCOUNT  CHECKOUT  CONFIRMATION   SIGN IN

Shipping Address

First Name | Last name

Company (optional)

Street address

Country [Select or begin typing V] | State or Province [Select or begin typing V] | Zip or Postal Code City | Phone

Payment methods

○ Pay with credit card   □ □ □   ○ Pay with Paypal □

Cardholder's name

Card number | CVV ? | Month V | Year V

Shipping Address  □ Same as shipping address

First name | Last name

Company (optional)

Street address

Country [Select or begin typing V] | State or Province [Select or begin typing V] | Zip or Postal Code City | Phone

Order Summary 1450
Product Name — $XXX USD
Yarn Quality — Variation Selection
Color — Variation Selection — Remove from Bag
Size — Variation Selection — Edit Item Total         1542   $XXX.00 USD
Shipping             $0.00 USD
Order Total          $XXX.00 USD

[ PLACE ORDER ] 1610

KNITTED TEXTILE METHODS AND SYSTEMS

CROSS-REFERENCE TO RELATED APPLICATIONS

This patent application is a Continuation-In-Part and claims priority to United States patent application entitled: "A PROCESS FOR MANUFACTURING A CUSTOM KNITTED PRODUCT", U.S. Ser. No. 15/344,535 filed on Nov. 6, 2016, the U.S. patent application being incorporated herein by reference.

BACKGROUND

Often people order a single garment as a sample or for customized designs or styles. Using a knitting machine for single garment production takes many hours, and is therefore costly. The knitting machine used is often in a different country, which increases shipping time and costs substantially. Further, the quality for single garment production, such as a sample garment, is often superior to mass-produced garments.

Fashion designers desire to minimize barriers to entry to the fashion industry by minimizing costs of sample garments, while maintaining high quality garments and minimizing inventory.

BRIEF DESCRIPTION OF THE DRAWINGS

FIGS. 10A through 10B show a block diagram of an overview flow chart of a Internet application to sign up to order a customized knitted product according to an embodiment.

FIGS. 11A, 11B, 12A through 12F, and 13A through 13D illustrate a set of screen shots used in ordering a customized knitted product according to an embodiment.

DETAILED DESCRIPTION

In a following description, reference is made to the accompanying drawings, which form a part hereof, and in which is shown by way of illustration a specific example in which the embodiments may be practiced. It is to be understood that other embodiments may be utilized and structural changes may be made without departing from the scope of the embodiments.

It should be noted that the descriptions that follow, for example, in terms of an a process for manufacturing a custom knitted product is described for illustrative purposes and the underlying system can apply to any number and multiple types of knitting machines, fabrics and yarns, and knitted apparel and products. In one embodiment, the a process for manufacturing a custom knitted product can be configured using yarn created for integrated functions incorporating a consumer's customizations. The a process for manufacturing a custom knitted product can be configured to include CNC knitting machines and accessories paired with the integrated control system.

In the following description, for purposes of explanation, numerous specific details are set forth in order to provide a thorough understanding of embodiments of the present disclosure. It may be evident, however, to one skilled in the art that embodiments may be practiced without these specific details.

Figure 1:
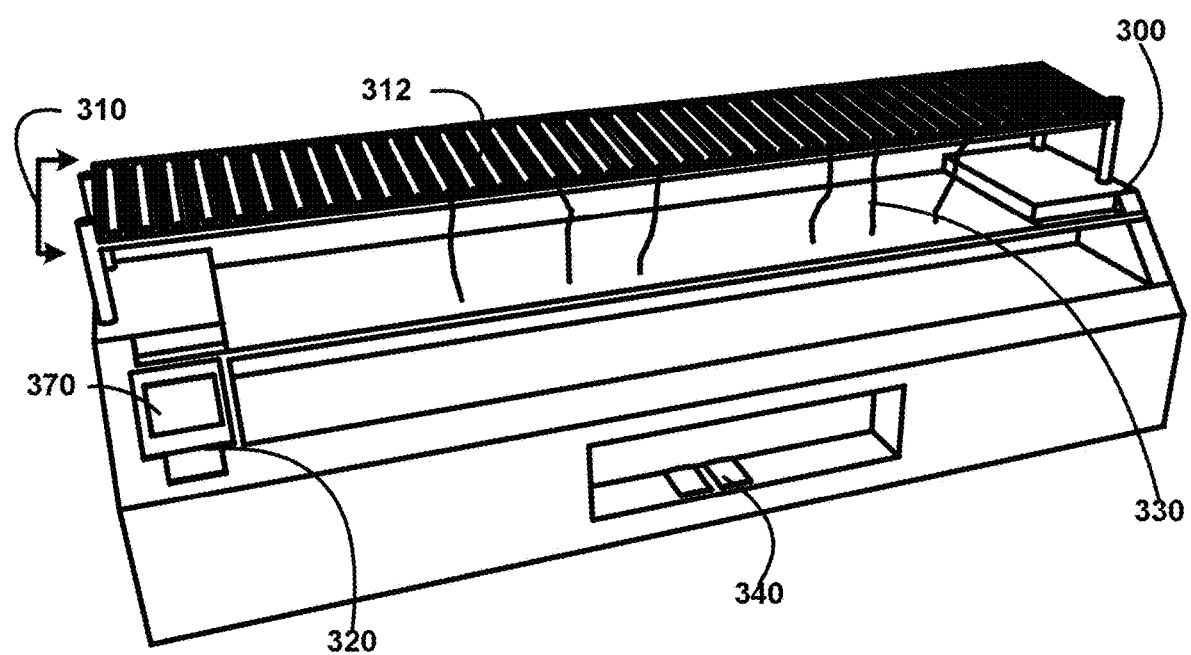
FIG. 1 shows for illustrative purposes an example of an adapted knitting machine according to an embodiment.

FIG. 1 illustrates an example of a knitting machine 300 according to an embodiment. The knitting machine 300 includes a creel housing 310, and a series of a plurality of yarn feeders 312 to feed yarn 330 into the knitting machine. The yarn feeder 312 selects the appropriate yarn, based upon consumer customizations for yarn quality and color, for example. Two different yarns may be fused together when the knitting machine 300 is switching between the different yarns to enable a more efficient knitting process to avoid stopping the process and maximizing use of the yarn feeders 312 in an embodiment. The knitting machine 300, according to an embodiment, may produce a customized knitted product 340.

The knitting machine 300 further includes an integrated control system 320 including at least one variation adapted knitting machine integrated control systems, at least one order tracking processor 1030, at least one internet communication device 1006, a thermal scanner, and at least one integrated control systems adaptation device to receive order information for processing knitted products. Adaptations can include knitting machines CNC accessories paired with the integrated control system 320.

The integrated control system 320 is coupled with a monitor 370 to display controls to an operator. As a result of a scan of the marking identifier of the knitted product, the operator may view the assembly instructions of the tech pack. If the operator detects a defective panel, the operator may select the knitted product panel on the monitor. The monitor 370 may include a selection area associated with the panel. When the operator selects the selection area, instructions may be sent to the knitting machine to knit an additional panel to replace the defective panel. In this embodiment, substantial time is saved in manufacturing time by just replacing the single defective panel, rather than the entire knitted product.

Figure 2:
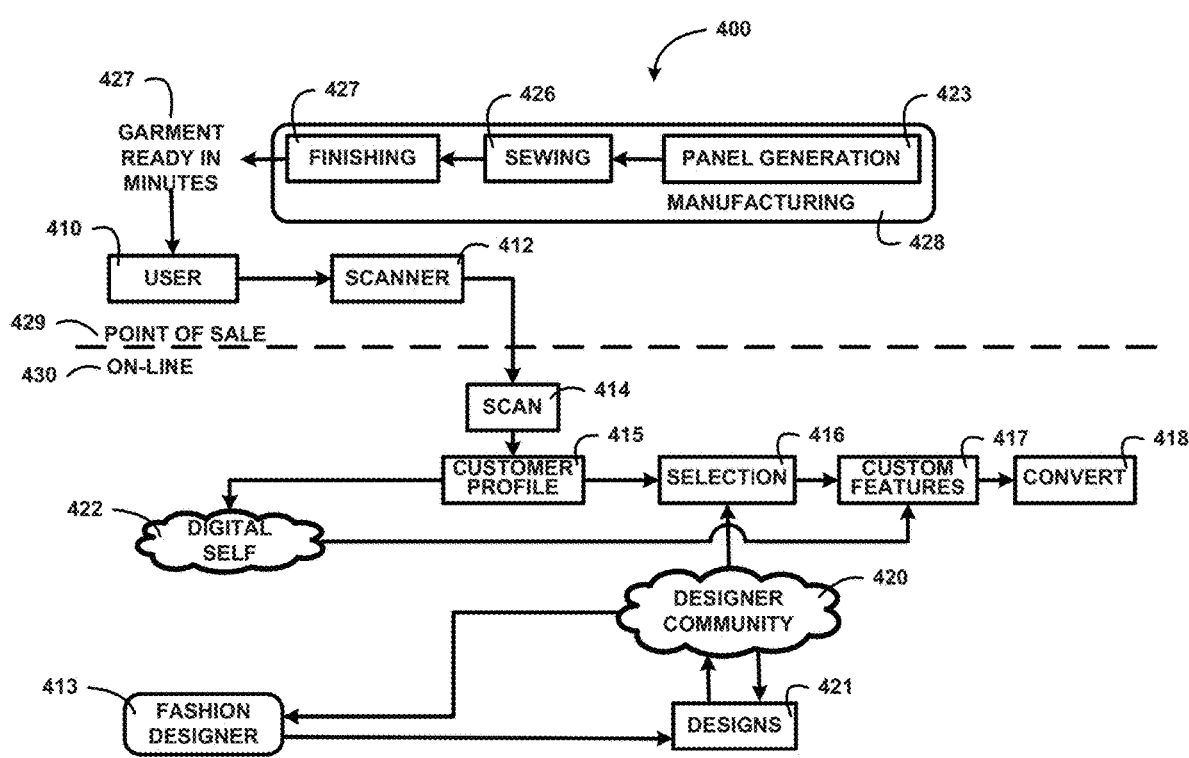
FIG. 2 illustrates a flow diagram of a knitting process according to an embodiment.

FIG. 2 illustrates a flow diagram of a knitting process 400 to manufacture the knitted product 340, according to an embodiment. The figure illustrates sequential activity blocks, which take place when a user orders a customized knitted product. In order to minimize user-waiting time, the components of the knitting process can be located in a single location, such as a retail store, so that users can obtain the products they order when ready.

In an embodiment, at a point of sale 429, the user 410 has his or her body scanned for preparation of a 2 or 3-dimensional rendition 414 of the user's body. Users may be able to have their body scanned while wearing regular clothing, or may wear close-fitting garments so that the scanner can obtain more accurate data if specified by a scanner 412. For a thermal scanner, the garments are substantially transparent and therefore, garments may be worn by the user as desired.

Examples of whole-body scanners suitable for use by the embodiments include white light scanners, structured white light scanners, eye-safe laser scanners, millimeter wave imaging scanner, thermal or heat body scanners, a camera, or a video camera. Whole-body scanners are known in the art and are available from manufacturers such as Cyberware, Inc., Monterey, Calif. (model WBX white light scanner); Breukmann GmbH, Meersburg, Germany (model body-SCAN structured while light scanner); Vitronic Machine Vision Ltd., Louisville, Ky. (model Vitus 3D Bodyscanner XXL, eye-safe laser scanner); Unique Solutions, Dartmouth, Nova Scotia, Canada (model Intellifit millimeter wave RF scanner); and Fluke Corporation (thermal scanner).

Specialized software converts the body scan to a 2- or 3-dimensional body scan rendition 414. Examples of software programs that may be used include Bodymetrics (San Francisco, Calif.), CREAFORM (Ametek), and Naked Labs, Inc. (Redwood City, Calif.). A selected knitted product from the display is scaled to the user's body shape, as described in embodiments herein. Examples of software programs and manufacturers, which provide for realistic draping and fit visualization of knitted products include Optitex 3D Virtual Prototyping by Optitex (New York, N.Y.); Vstitcher by Browzwear Solutions Pte. Ltd. (Singapore); and Deviron LLC (Ithaca, N.Y.). The selected knitted product may be further customized as described herein.

Once the body scan is complete, the user's profile 415 may be created or amended. The profile may include any search or order history, registration information, and any other user preferences gathered from any source.

The user may select a style and/or design at the style or design selection block 416, as described with reference to an Internet page in detail herein. The styles for selection can be shown as rotating three-dimensional holographic projections, models on a display, the body scan of the user, or photographs of finished garments.

The style and/or design block may be received from designer community 420 comprising fashion designers 413, both amateur and professional. The fashion designers 413 may submit their designs 421 to the knitting application 530, as described herein. The knitting application 530 includes an integrated knitted textiles variation ecommerce web application 1102.

Once the style is selected, the user would then be able to select custom features 417 for the knitted product. For example, the user may be given the option to select colors, size of the knitted product, fit type of the knitted product, size or dimension of at least one feature of the knitted product, a color of the at least one feature, a design on the at least one feature, a yarn quality of the at least one feature, a yarn type of the at least one feature, a stitch type for the yarn for the at least one feature, a yarn weight for the at least one feature; and a wash type of the yarn for the at least one feature. Further, any finishing features may be selected, such as buttons, pockets, rivets, clips, Velcro, or zippers.

In an embodiment, the style and design metadata in the tech pack can be used for visualization of fabric draping, and fit along the user contours around a rendition of a specific body shape. In this manner, users can see an image of their own body wearing the desired design, and can adjust fabric draping, fit, and other features as desired.

Certain designers may wish to maintain a certain style by limiting the customization options available to users. In certain embodiments, a computer program allows the user to add, delete, amend, or scale customized features on their scanned rendition. A knitted product design tool may be used by fashion designers and/or the users to create the styles or designs, if desired. The design tool may include, for example, Click & Sew by Wild Ginger; Dress Shop Pro and My Pattern Designer by Livingsoft; Garment Designer by Cochenille; and Pattern Design Software by Optitex. The designs may be uploaded to the knitting application 530. A user or a fashion designer can be paid for a user selecting their style and/or design. In one embodiment, the barrier-to-entry for new designers to contribute designs to the designer community is substantially eliminated.

The customized knitted product on the display may then be converted into a file readable by the knitting machine at a convert block 418. The file may comprise a tech pack including a plurality of specifications for the knitted product. The plurality of specifications including at least one of the following specifications: dimensions of each panel of the knitted product; at least one yarn color of each panel; at least one design on each panel; at least one yarn quality of each panel; at least one yarn type used for each panel; at least one stitch type for the yarn in each panel; thread color; at least one stitch tension or width in each panel; at least one view of the finished knitted product; assembly instructions for the knitted product; any finishing features or details such as labels; and at least one wash type of each panel.

The convert block 418 may divide the knitted product into several knitted panels to be knitted individually. The knitted panels may be knitted at block 423, which could be at a point of sale 429.

The knitted panels may be sewn together as indicated in the tech pack at block 426 and finished at block 427. At the finishing block 427, quality control including dimensional and color confirmation may be executed. Finishing may also include belt looping or elastic insertion; snaps or zipper creation; buttonhole creation and button sewing equipment; label placement and type; rivets; and embroidery. The finishing equipment may be any kind of equipment used after manufacture to provide the garment in a ready-to-wear condition to the user. For example, the finishing equipment can improve the look, performance, or feel of the completed garment, and may comprise washing, drying, and pressing equipment, such as a washer (conventional or stone washer), a dryer, and/or an iron. The finishing equipment can also comprise a garment wear station or stretching station. The finished knitted product may then be presented or shipped to the user 410.

Figure 3:
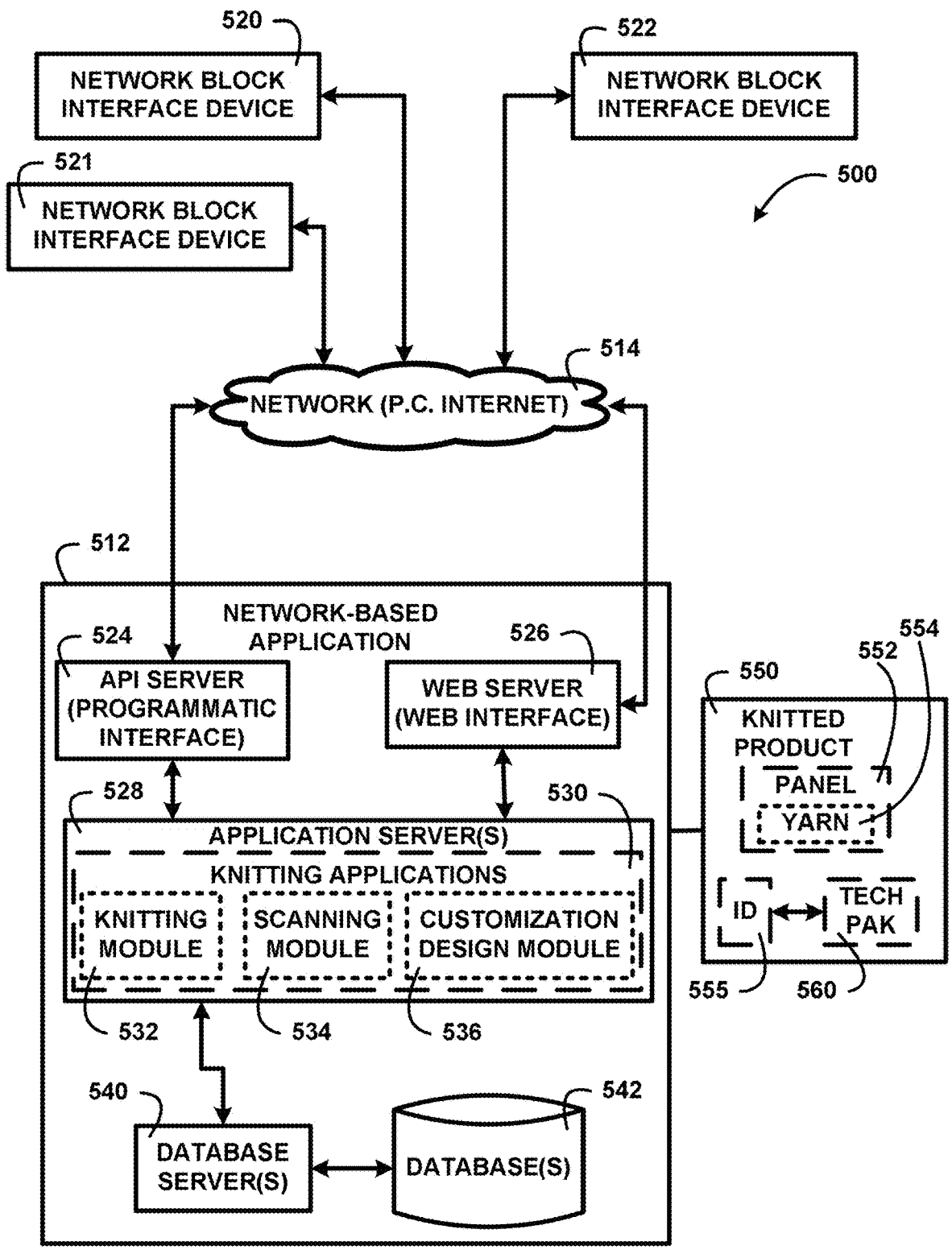
FIG. 3 illustrates a network diagram depicting a system 100 having a client-server architecture, according to an example embodiment.

FIG. 3 illustrates a network diagram depicting a system 500 having a client-server architecture, according to an example embodiment. A system, in the example form of a network-based system 512, provides server-side functionality, via a network 514 (e.g., the Internet, a public or private telephone network (wireline or wireless), a private wireless network using technologies such as Bluetooth or IEEE 802.11x or other networks) to one or more network interface devices 520, 521, 522. In a client-server architecture, FIG. 3 illustrates, for example, a network interface device being a Internet client (e.g., a browser, such as the INTERNET EXPLORER® browser developed by MICROSOFT®) executing on client machine, e.g. on a network-based device. A device application or a programmatic client may also execute on the client machine. Embodiments are of course not limited to a client-server architecture, and could equally well find applications in a distributed, or peer-to-peer, architecture system.

The network interface devices, including network-based device(s) 520, 521, 522, may include a mobile device, a palmtop computer, a laptop computer, a desktop computer, a personal assistant device, a cellular telephone, a communications device, a wireless telephone, a tablet, a land-line telephone, a control system, a camera, a scanner, a television, television cable, a telephone with a Internet browser, a facsimile machine, a printer, a pager, and/or a personal trusted device. The device 520, 521, 522 may include a card, such as a smart card, a magnetic card, and/or a key card. The device may include a telephone or any device capable of Short Messaging Service (SMS) messaging, multimedia messaging service (MMS) messaging and/or generating audio tones, such as dual-tone multi-frequency (DTMF) tones. The device may be browser-enabled. The device may engage in an interactive message and/or open communication session, such as SMS, electronic mail, xHTML, Wireless Application Protocol (WAP), Internet, interactive voice response (IVR) and/or other mobile interfaces. The communication session between a client machine and the network-based system may involve multiple technology modalities, e.g. the client user may engage the system via SMS and receive a responsive communication as an SMS with an embedded hyperlinked URL directing the client user's device to a WAP or Internet page. A hyperlinked URL may be delivered directly to the device from the application server(s) 528 and may be used to access an Internet site or a microbrowser, such as a WAP site. The device 520, 521, 522 may enable mobile videophone communications, television signals, and/or radio signals. The device may include a receiver or transmitter to receive or to transmit near field communications.

At least one of the devices 520, 521 or 522 may be associated with an account holder. Turning specifically to the network-based system 512, an Application Program Interface (API) server 524, and an Internet server 526 may be coupled to, and may provide programmatic interfaces to one or more application servers 528. The devices may use one or more of these interfaces to access the application server(s) 528. For example, the Internet client may access the application server(s) 528 via the Internet interface supported by the Internet server 526. The Internet interface may include an Internet browser or any microbrowser, such as xHTML or WAP. Similarly, the programmatic client accesses the various services and functions provided by the application server(s) 528, via the programmatic interface provided by the API server 524 and/or the Internet server 526. In an additional embodiment, an application supported by one or more applications of the application server(s) may be downloadable to the network-based device. The device(s) may host the interface associated with the one or more applications of the application server(s) 528. The interface on the device may be an API interface, an SMS interface, an Internet interface, and/or an IVR interface. Consumer wireless device platforms, such as Java 2 Platform Micro Edition (J2ME), J2SE and J2EE allow developers to use Java and a wireless toolkit to create applications and programs for the device 522. The J2ME interface may include an application-programming interface (API) for the device. The application of the programmatic client may also access the Internet using, for example, Binary Runtime Environment for Wireless (BREW).

The design files, which are used by the embodiments to manufacture clothing, can employ any kind of file format, which is used in the fashion industry. For example, the design files can be stored in a proprietary format, DXF format, XML format, or other format for use by the embodiments.

The network 514 may include a mobile telephone network, a wireless wide area network (WWAN), a wireline telephone network, a wireless local area network (wireless LAN or WLAN), a wireless Metropolitan Area Network (MAN), and/or a wireless personal area network (PAN) (e.g., a Bluetooth® network). Other network-based technologies that may be used to connect include PON, VSAT satellite or Global Positioning Satellite (GPS), Micro-impulse Radar, near-filed communication, Radio Frequency identification (RFID), UltraWide Band, and/or Infrared. The network-based device may connect to the Internet using mobile Internet exchange, e.g. Wireless Application Protocol (WAP) and/or Hypertext Transport Protocol (HTTP).

The application server(s) 528 may host one or more knitting applications(s) 530. The knitting applications 530 may include a knitting management module (or knitting module) 532, a scanning module 534 and a design module 536. The application server(s) and modules 532, 534, and 536 may have access to a database 542 through, for example, the database server(s) 540. The database may include user account information, such as the user profile and user selections, the styles and designs, and the tech pack information.

In an embodiment, the knitting module 532 may convert the customization selections to the tech pack 560 described herein. The knitting module 532 may instruct the knitting machine 300 to knit the customized knitted product 550. The knitting module 532 may comprise one of the software products described herein.

In an embodiment, the scanning module 534 converts the scan from the scanner 412 to the scanned rendition 414. The scanning module 534 may comprise one of the software products described herein.

In an embodiment, the design module 536 enables the user and/or a fashion designer to create knitted product designs and styles, and to customize those knitted products, as described herein. The design module 536 may comprise one of the software products described herein.

The knitted product 550 may include knitted panels 552 formed of yarn 554. The knitted panels may include a front panel, a back panel, and side panels to be fused together, e.g., sewn together per instructions in the tech pack 560.

The knitted product further comprises a marking identifier 555 for the knitted product and/or the knitted panels, indicating information regarding the knitted product. The marking identifier 555 may indicate where in the process the knitted product is, e.g., shipping, knitting, received, etc., as a tracking device. The marking identifier 555 may be sensed by a sensor in the process and may refer the operator to the tech pack 560, as described in more detail herein. The marking identifier may include a yarn type, such as a metallic or magnetic yarn knitted into the panel. The marking identifier may additionally or alternatively include a particular stitch, or a particular design in the panel. The marking identifier may include any device coupled with the knitted product or panel, such as a plastic device. The device may be able to be sensed by any type of suitable sensor, such as radio frequency sensor, magnetic sensor, color sensors, etc.

The knitted product may include denim, twill, corduroy, flannel, printed designs, integral designs with different yarn colors or quality or type, fleece, terry, and mesh, in embodiments. The knitted product 550 may include a garment, upholstery or fabric in an embodiment. The garment can be a pair of jeans, a pair of pants, shirt, blouse, vest, suit, dress, skirt, undergarment, hat, purse or bag, and shoes. Upholstery may include blankets or artwork. Artwork may include images on a substrate that is transferable to an exterior of a vehicle.

In embodiments, the yarn 554 may have different yarn types, different yarn quality, and different yarn colors available. In embodiments, the yarn 554 may comprise any suitable materials, such as cotton, silk, cashmere, and even metals, wood, and plastics. The yarn 554 may be any material suitable for use in a knitting machine with sufficient flexibility to stitch, and sufficient structural integrity to maintain its intended shape. The yarn may be pre-colored or dyed on-demand.

Figure 4:
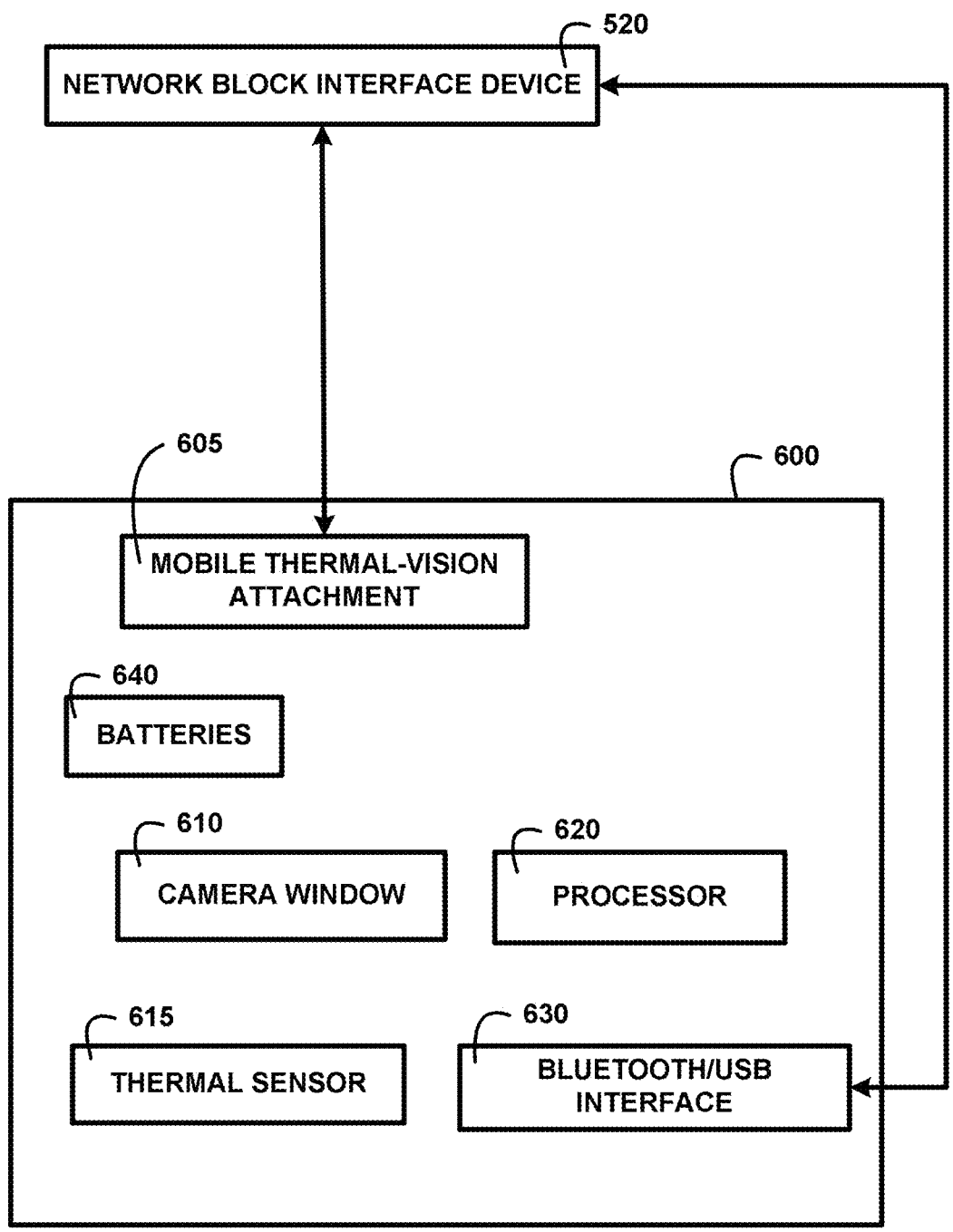
FIG. 4 illustrates a thermal scanner according to an example embodiment.

FIG. 4 illustrates a thermal scanner 600 according to an example embodiment. The thermal scanner 600 may include a mobile thermal vision attachment 605 to couple the thermal scanner 600 to the network-based device 520. The thermal scanner 600 may further have a camera window 610 to point at a heat signature of an entity, such as a human user. The thermal scanner 600 may further have a thermal sensor 615 to pick up the heat signature of the entity. The thermal scanner 600 may further have a processor 620 to execute instructions related to scanning the entity. The thermal scanner 600 may further have an interface 630, such as Bluetooth® or a USB port to allow the thermal scanner 600 to communicate with a computing device described herein. The thermal scanner 600 may further have batteries 640 or an alternative power source or an interface to power from the device 520 or the computing device.

Alternatives to a thermal scanner are contemplated herein. For instance, the user may manually enter their measurements into the scanning module, or one of the scanners named herein may be used to provide a rendition of the user.

Figure 5:
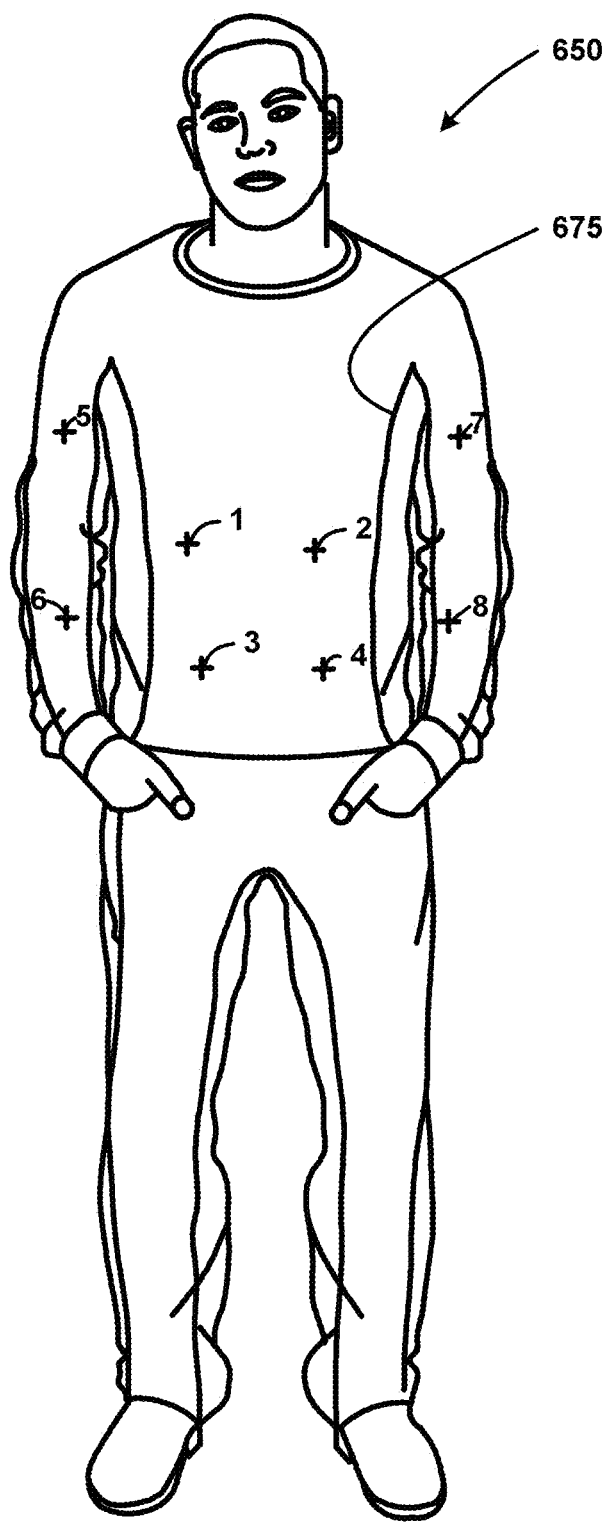
FIG. 5 illustrates an entity scanned by the thermal scanner according to an example embodiment.

FIG. 5 illustrates an entity 650 scanned by the thermal scanner 600 according to an example embodiment. The entity 650 may turn around for the thermal scanner 600 to take multiple pictures of the entity to procure a 3-D rendition of the entity (or various 2-D renditions), or the thermal scanner may have video capabilities. The entity 650 in this illustration includes a man with loose-fitting apparel. A heat signature of an outline 675 of the man is scanned from various perspectives by the thermal scanner. In this embodiment, the man has on the loose-fitting apparel. The loose-fitting apparel is substantially transparent to the thermal scanner. In this embodiment, the man does not have to remove any clothing or put on any apparatus to get an accurate outline 675 of his body from each perspective. Thus, a more accurate outline 675 of the man will be processed and displayed as an avatar of the man for use with embodiments described herein.

Figure 6A:
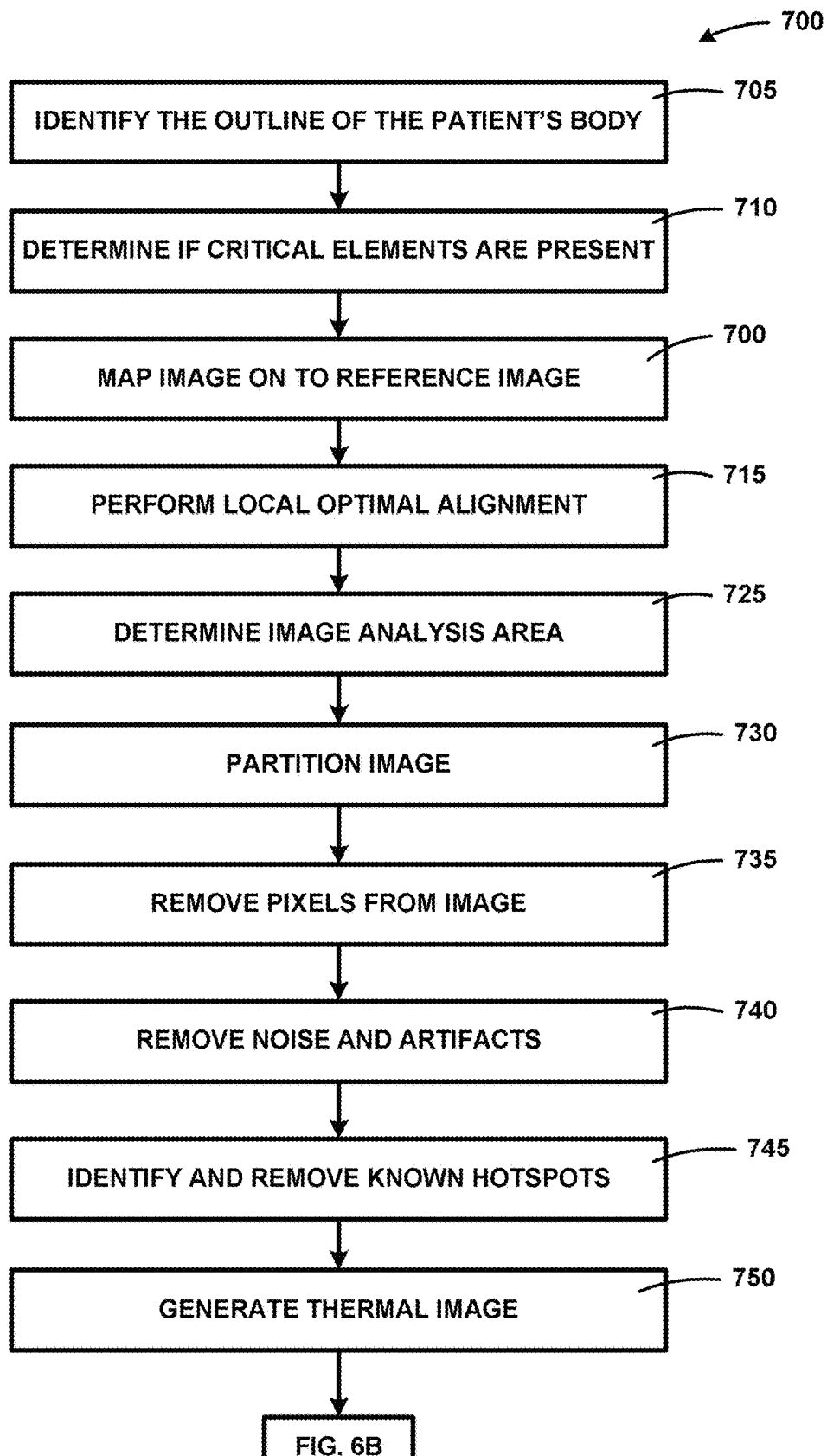
FIGS. 6A and 6B illustrate a flow diagram of a knitting process including the entity scan details, according to an embodiment.
Figure 6B:
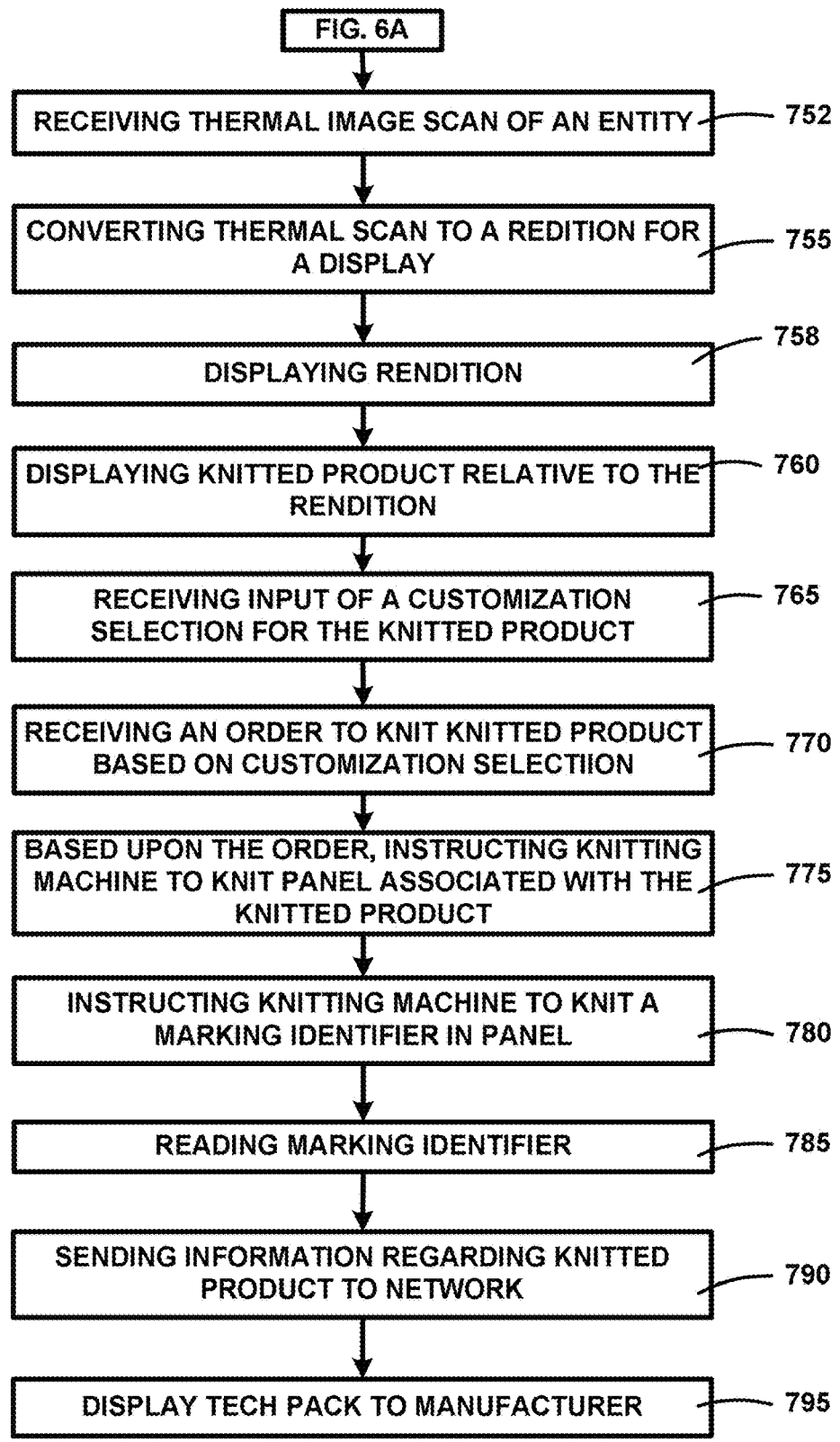

FIGS. 6A and 6B illustrate a flow diagram of a knitting process 700 including the entity scan details, according to an embodiment. The knitting process includes the scanning module identifying an outline of the user at block 705 using one of the scanning methods described herein. The scanning module may then optionally determine if critical expected elements are present in the entity scan image at block 710. The scanning module may then optionally map the image to a reference image at block 715. The scanning module may then optionally perform optimal alignment to align or orient the reference image at block 720 for the customization design module. The scanning module may then optionally determine an image analysis area of the entity at block 725. The scanning module may then optionally partition the reference image of the entity at block 730. The scanning module may then optionally remove any pixels from the reference image of the entity at block 735. The scanning module may then optionally remove any noise or artifacts from the reference image of the entity at block 740. The scanning module may then optionally identify and remove known hotspots, if any, from the reference image at block 745. The scanning module may then generate the thermal image of the entity at block 750.

Continuing the process at FIG. 6B, the scanning module may then send the thermal image of the entity to a receiving computing device at block 752. The computing device may convert the thermal scan to a rendition for a display at block 755. The computing device may display the rendition at block 758. The computing device may further display a knitted product relative to the rendition at block 760. The computing device may receive input of a customization selection from the customization module for the knitted product at block 765. The computing device may receive an order, from the user, to knit the knitted product based on the customization selection at block 770. The computing device may, based upon the order, instruct the knitting machine to knit at least one panel associated with the knitted product at block 775. The computing device may instruct the knitting machine to knit a marking identifier in the knitted panel at block 780. A sensor associated with the computing device may read the marking identifier at block 785. The sensor may be a photo sensor, a magnetic sensor, a UV sensor, or any suitable sensor to read the marking identifier. The computing device may send information regarding the knitted product, received from the marking identifier, to the network for tracking the knitted product and/or quality control at block 790. The monitor may display tech pack information to the operator or manufacturer of the knitted product for the quality control, for instance, at block 795.

Figure 7:
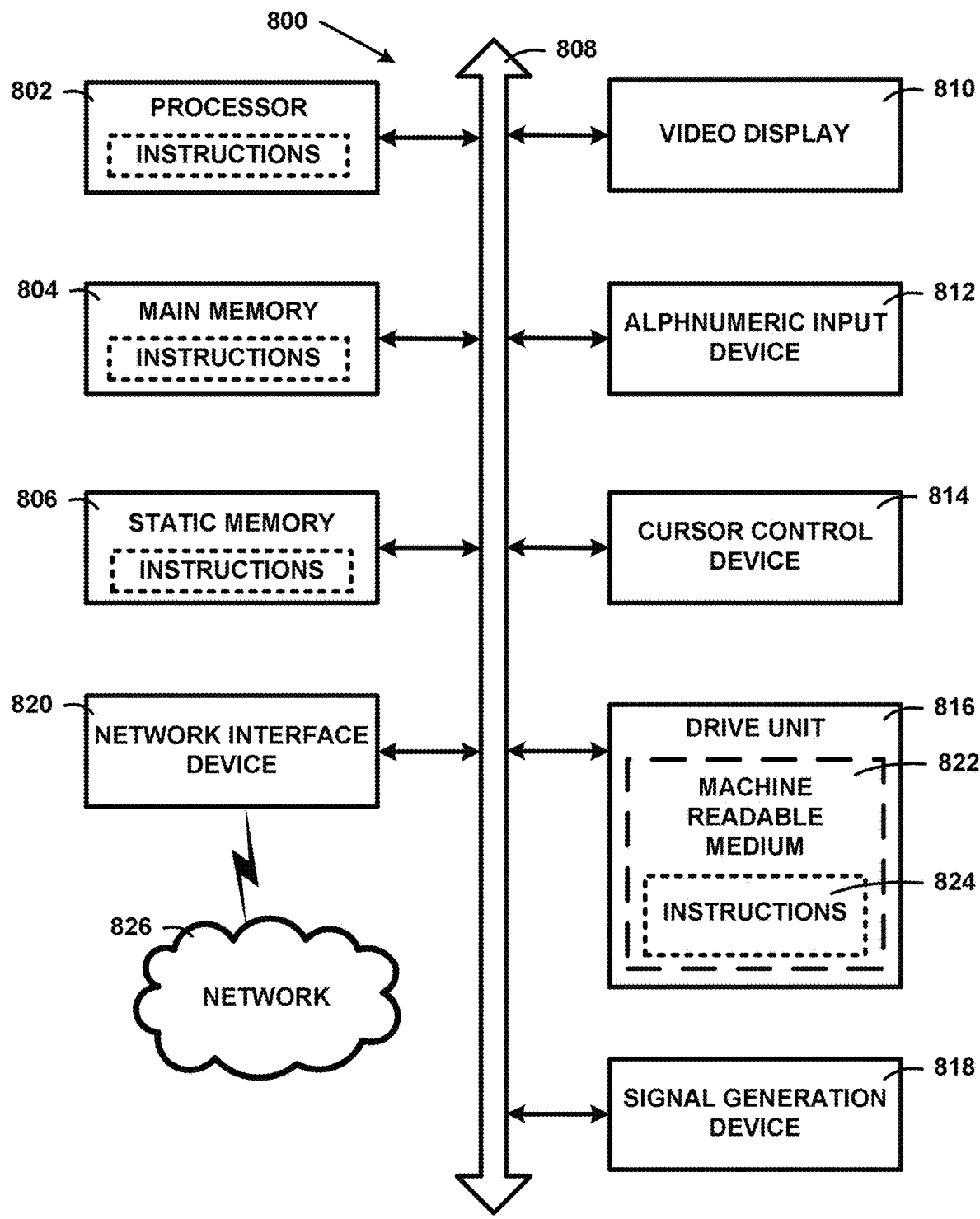
FIG. 7 illustrates a diagrammatic rendition of a machine in the example form of a computer system according to an embodiment.

FIG. 7 shows a diagrammatic rendition of a machine in the example form of a computer system 800 within which a set of instructions, for causing the machine to perform any one or more of the methodologies discussed herein, may be executed. In alternative embodiments, the machine operates as a standalone device or may be connected (e.g., network) to other machines. In a network deployment, the machine may operate in the capacity of a server or a client user machine in server-client user network environment, or as a peer machine in a peer-to-peer (or distributed) network environment. The machine may be a server computer, a client user computer, a personal computer (PC), a tablet PC, a set-top box (STB), a Personal Assistant (PDA), a cellular telephone, a mobile device, a palmtop computer, a laptop computer, a desktop computer, a personal assistant, a communications device, a wireless telephone, a land-line telephone, a control system, a camera, a scanner, a facsimile machine, a printer, a television, television cable a pager, a personal trusted device, a Internet appliance, a network router, switch or bridge, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software 824) embodying any one or more of the methodologies or functions described herein. The instructions 824 may also reside, completely or at least partially, within the main memory 804, the static memory 806, and/or within the processor 802 during execution thereof by the computer system 800. The main memory 804 and the processor 802 also may constitute machine-readable media.

The instructions 824 may further be transmitted or received over a network 826 via the network interface device 820.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein below. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry, (e.g., as encompassed within a general-purpose processor or other programmable processor) which is temporarily configured by software to perform certain operations. It may be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, or optical and magnetic media.

As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

Example Embodiments

Figure 8:
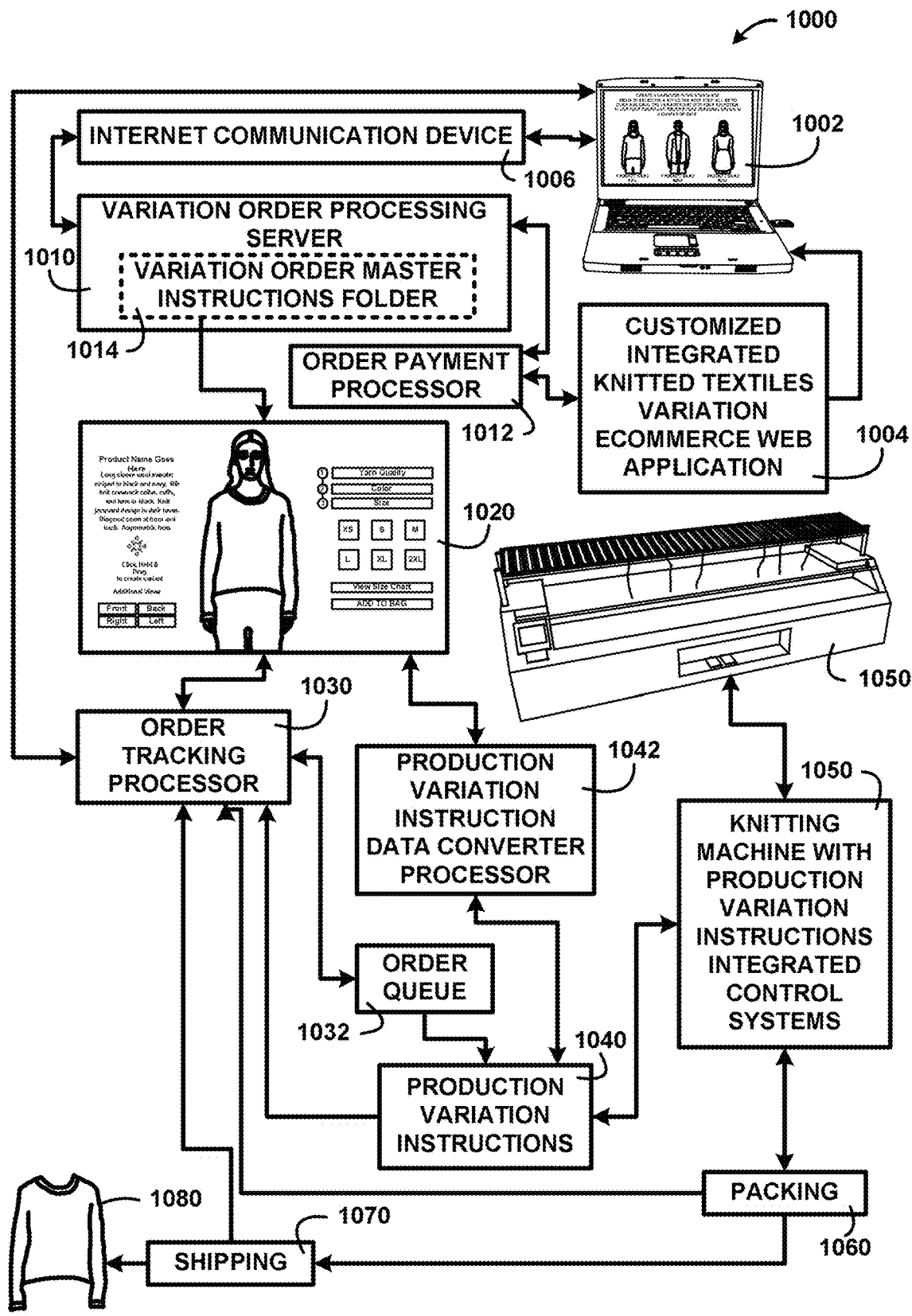
FIG. 8 shows a block diagram of an overview of a process for manufacturing a custom knitted product according to an embodiment.

FIG. 8 shows a block diagram of an overview of a process for manufacturing a custom knitted product according to an embodiment. FIG. 8 shows a knitted textile consumer Internet device logged into customization Internet site 1000 using a knitted products customization ecommerce Internet application 1004. The knitted products customization ecommerce Internet application 1004 communicates with an order-processing server 1010 using an Internet communication device 1006. The consumer logs into the order-processing server 1010. The order processing server 1010 processes the consumer queries on the customization Internet site to select an apparel style and customizations to individualize the garment to suit the consumer's desired changes for an order. A consumer order selection 1020 is made and transmitted to the order-processing server 1010. The price of the order with customizations is calculated, transmitted to and displayed on the consumer Internet device. The consumer inputs payment data. The order-processing server 1010 processes the payment using an order payment processor 1012. Upon a successful payment the consumer order is recorded using an order tracking processor 1030 and processed into an order queue 1032 according to an embodiment.

The order-processing server 1010 processes the consumer style and customizations, converting the data into production customization instructions 1040. The converted data is transmitted to a knitting machine with production customization instructions integrated control system 1050 when the consumer order queue production position is reached. The consumer garment is knitted on the knitting machine with production customization instructions integrated control system 1050 incorporating the consumer-selected customizations according to an embodiment.

Upon garment completion, the order tracking processor 1030 transmits garment packing 1060 instructions and the garment is packed for shipping. When the packing 1060 is completed the order tracking processor 1030 transmits garment shipping 1070 instructions including the consumer inputted shipping address data. The order tracking processor 1030 records the shipping 1070 tracking code in the order-processing server 1010. A consumer ordered garment is delivered to consumer 1080. During the order processing the consumer can log into the customized knitted products customization ecommerce Internet application 1004 and follow the progress of their order according to an embodiment.

Figure 9A:
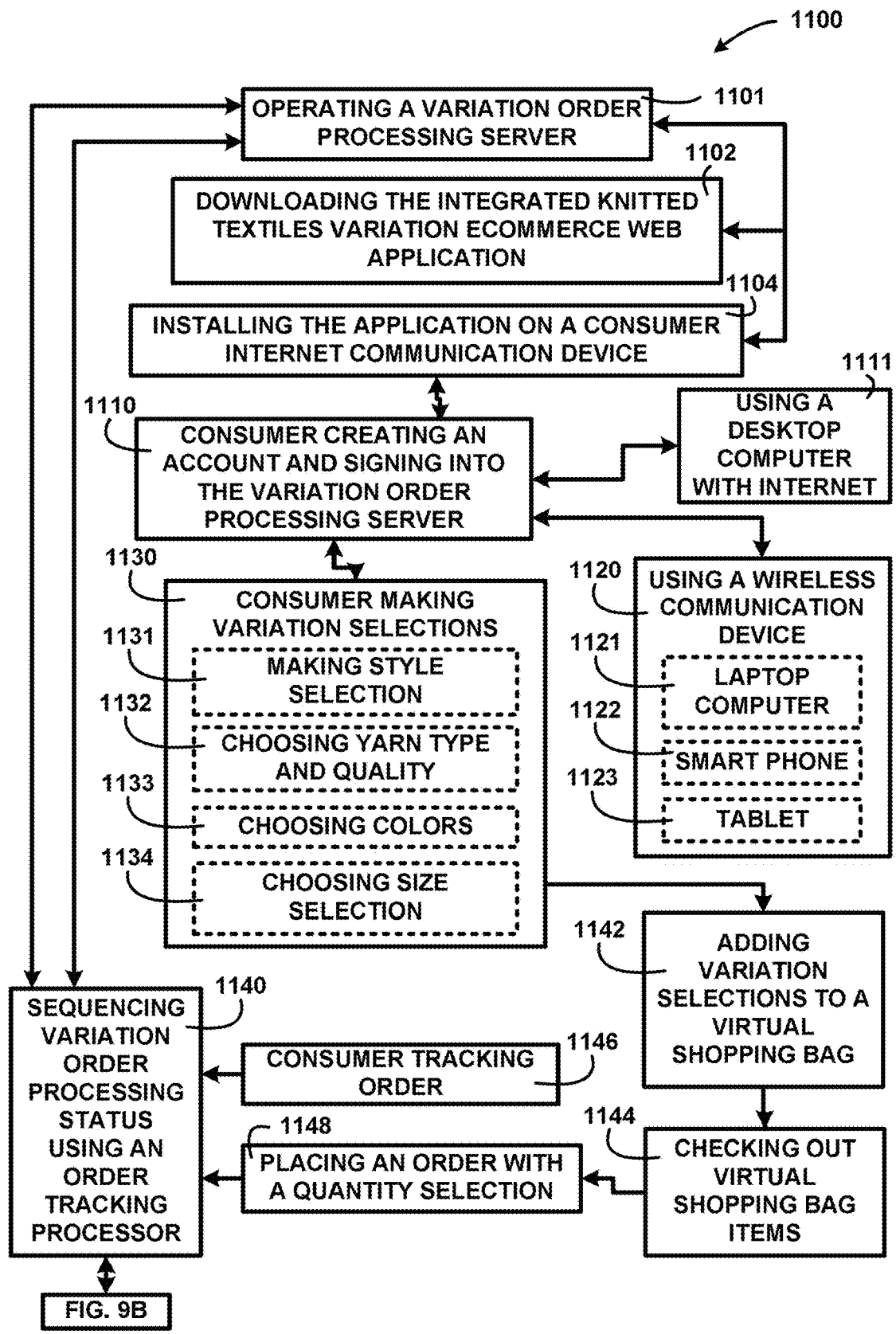
FIGS. 9A and 9B show a block diagram of an overview flow chart of a process for manufacturing a custom knitted product according to an embodiment.

FIG. 9A shows a block diagram of an overview flow chart of a process for manufacturing a custom knitted product according to an embodiment. FIG. 9A shows operating an order-processing server 1100. The order processing server 1100 processes downloading the integrated knitted textiles variation ecommerce web application 1102 and installing the application on a consumer Internet device communication device 1104. A consumer creating an account and signing into the order-processing server 1110 can be using a desktop computer with Internet 1111.

A consumer creating an account and signing into the order processing server 1110 can be using a wireless communication device 1120 including laptop computer 1121, smart phone 1122, and tablet 1123. A consumer making customizations 1130 can be making style selection 1131, choosing yarn type and quality 1132, choosing colors 1133 and choosing size selection 1134.

Upon completing selections the consumer can proceed to adding customizations to a virtual shopping bag 1142. During checking out virtual shopping bag items 1144 the consumer can continue by placing an order with a quantity selection 1148. The consumer order is tracked with sequencing order processing status using an order tracking processor 1140. The order tracking processor records consumer order tracking 1146 throughout the fabrication processing steps according to an embodiment. The process flow chart description continues on FIG. 9B.

Figure 9B:
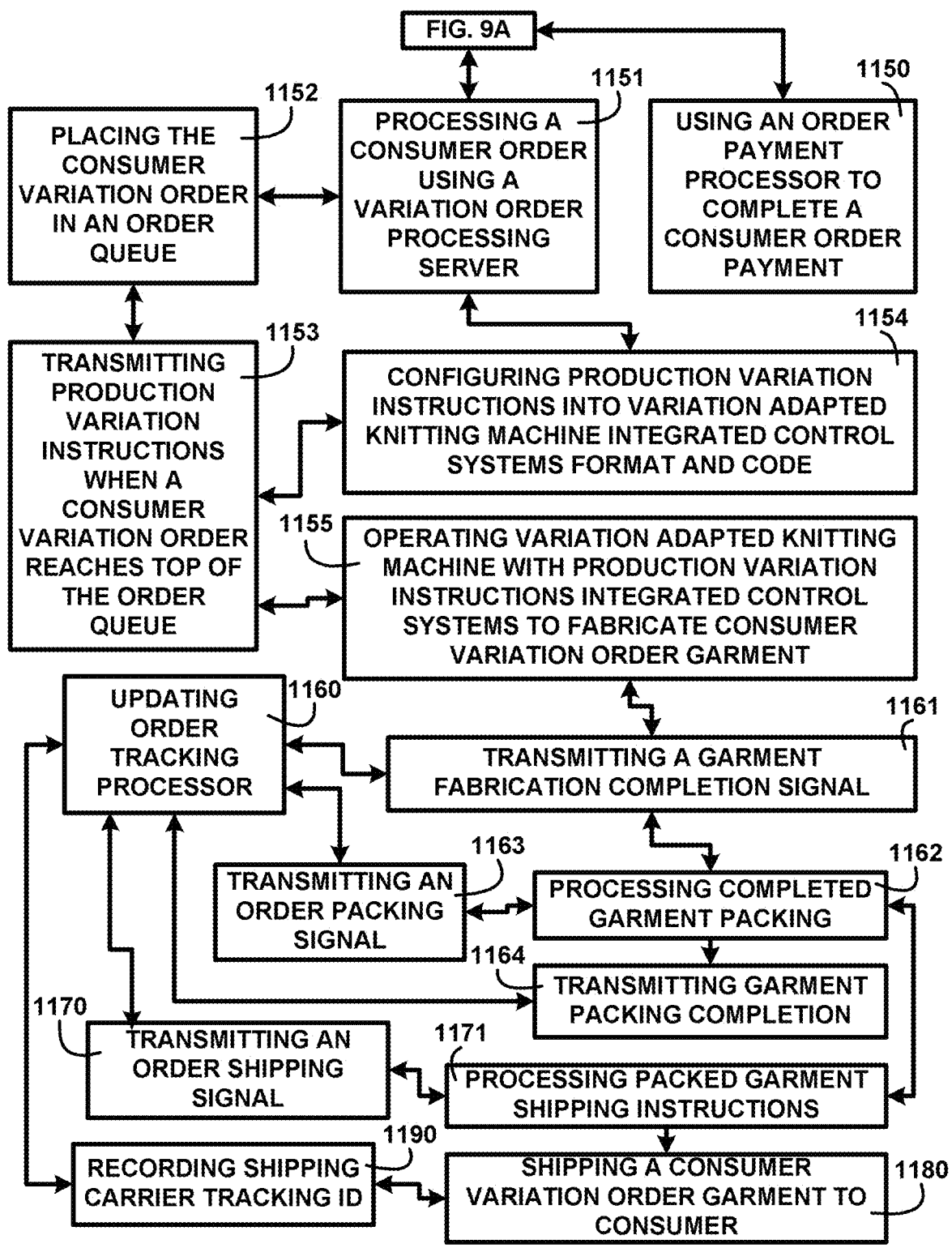

FIG. 9B shows a block diagram of an overview flow chart of a process for manufacturing a custom knitted product order processing to complete a consumer order payment 1150. Successful completion of the consumer order payment triggers processing a consumer order using an order-processing server 1151. The order-processing server 1151 may be used for placing the consumer order in an order queue 1152.

The order-processing server 1151 may be used for configuring production customization instructions into customization adapted knitting machine integrated control system format and code 1154. The order-processing server may be used for transmitting production customization instructions when a consumer order reaches top of the order queue 1153. Operating customization adapted knitting machine with production customization instructions integrated control system to fabricate consumer order garment 1155.

Continuous tracking of a consumer order is updated by transmitting a garment fabrication completion signal 1161 for updating the order tracking processor 1160. The order tracking processor 1160 may continue the processing by transmitting order-packing signal 1163. The order-packing signal can be configured to include a determination of the packing materials including a packing box size. The packing materials determined are paired with the completed garment for processing completed garments packing 1162. Transmitting garment-packing completion 1164 is sent for updating order tracking processor 1160 tracking status.

The order tracking processor 1160 continues the processing by transmitting an order-shipping signal 1170 including processing packed garment shipping instructions 1171. Processing packed garment-shipping instructions 1171 can be configured to include automatically printing of shipping documents. A package carrier upon completion of shipping preparation processing arranges picking up the packed finished garment for shipping a consumer order garment to consumer 1180. Recording shipping carrier tracking ID 1190 data takes place when updating order-tracking processor 1160. The consumer can sign in with the knitted products customization ecommerce Internet application to get current order tracking status including the shipping tracking data according to an embodiment.

Figures 10A, 10B:
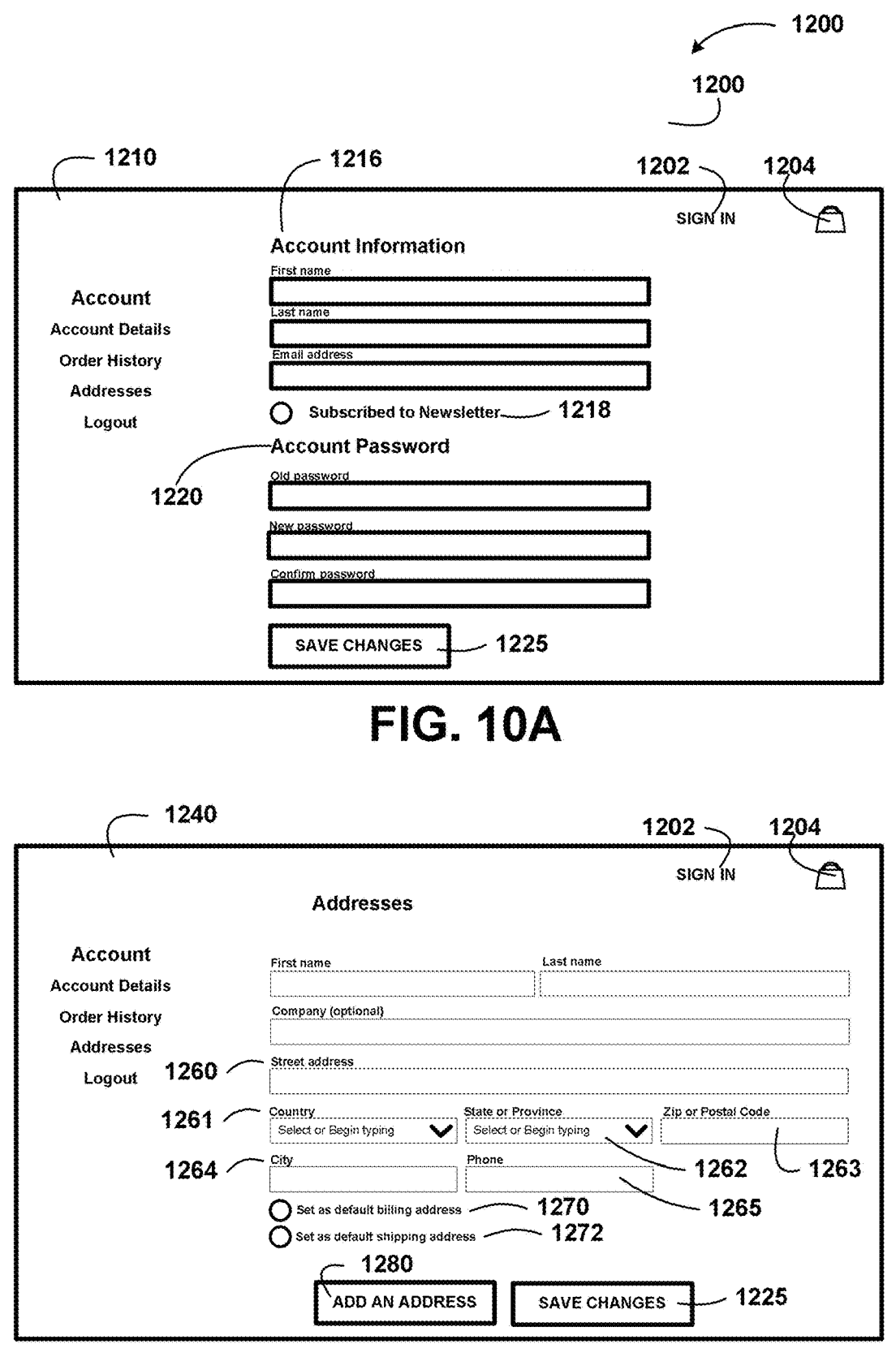

FIG. 10A shows a block diagram of an overview flow chart of Internet application consumer account page according to an embodiment. FIG. 10A shows a consumer creating an account 1200 using a knitted products customization ecommerce Internet application consumer account page 1210. The knitted products customization ecommerce Internet application consumer account page 1210 gives the consumer an option to sign in 1202 if they already have an account. A shopping bag icon 1204 is for use in placing a knitted products order. The consumer inputs account information 1216 including for example first name, last name and email address.

The consumer can indicate whether they are subscribed to newsletter 1218. The consumer can enter an account password 1220. The consumer may change their account password 1220 by entering an old password, new password, confirm password and then save changes 1225. The knitted products customization ecommerce Internet application consumer account page 1210 can be used to check an account, account details, order history, addresses and logout according to an embodiment.

FIG. 10B shows a block diagram of an overview flow chart of Internet application consumer addresses page according to an embodiment. FIG. 10B shows an Internet application consumer addresses page 1240 with the sign in 1202 and shopping bag icon 1204. The Internet application consumer addresses page 1240 is automatically populated with a first name and last name of the account data from the order-processing server. The consumer may input a street address 1260, country 1261, state or province 1262, zip or postal code 1263, city 1264, and phone 1265. The consumer may select the address data entered to set as default billing address 1270 and set as default shipping address 1272. The consumer may add an address 1280 for example a different shipping address and then save changes 1225 according to an embodiment.

Figure 11A:
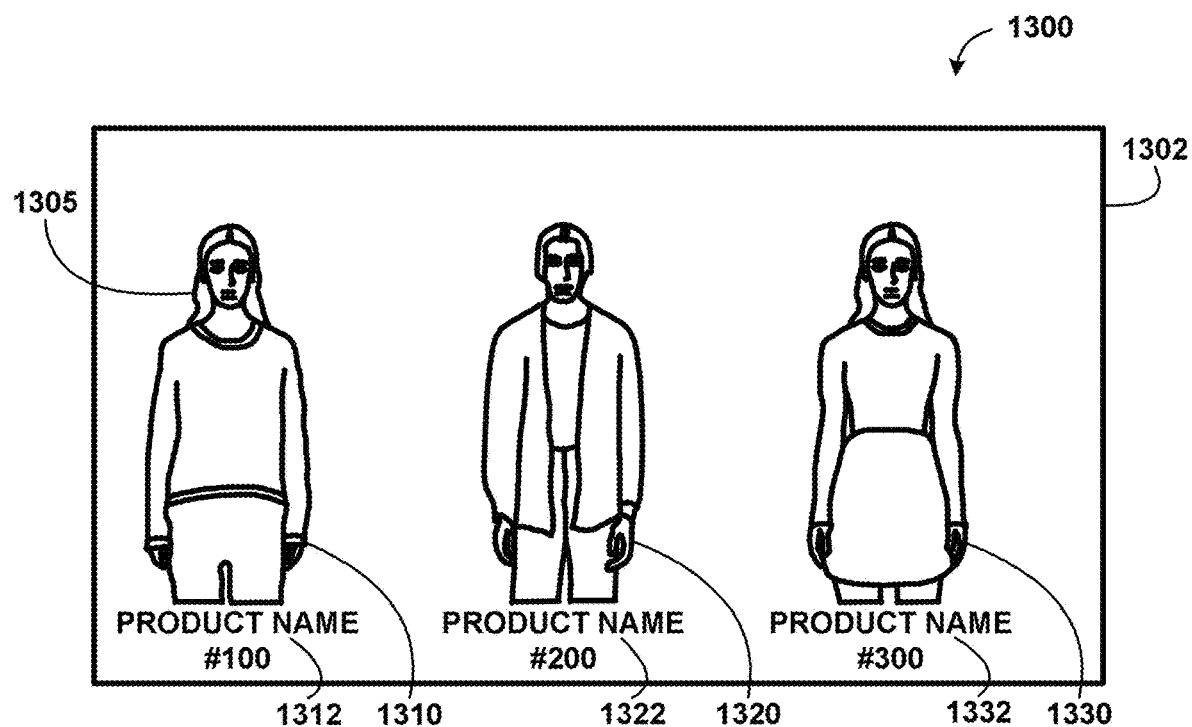

FIG. 11A shows a block diagram of an overview flow chart of a style selection page 1300 according to an embodiment. The style selection page 1300 includes instructions for the consumer to select a desired style. Next, the user may click and drag any suitable feature, such as sleeve length or a button, relative to the selection. The user may place the order and receive the personal design in a couple of days as shown at page 1302. FIG. 11A shows for example apparel style #100 1310 with an identifying product name #100 1312 and number. Other styles are displayed including, for example, apparel style #200 1320 with product name #200 1322, and apparel style #300 1330 with product name #300 1332 for a selection by the consumer garment style selection according to an embodiment.

Figure 11B:
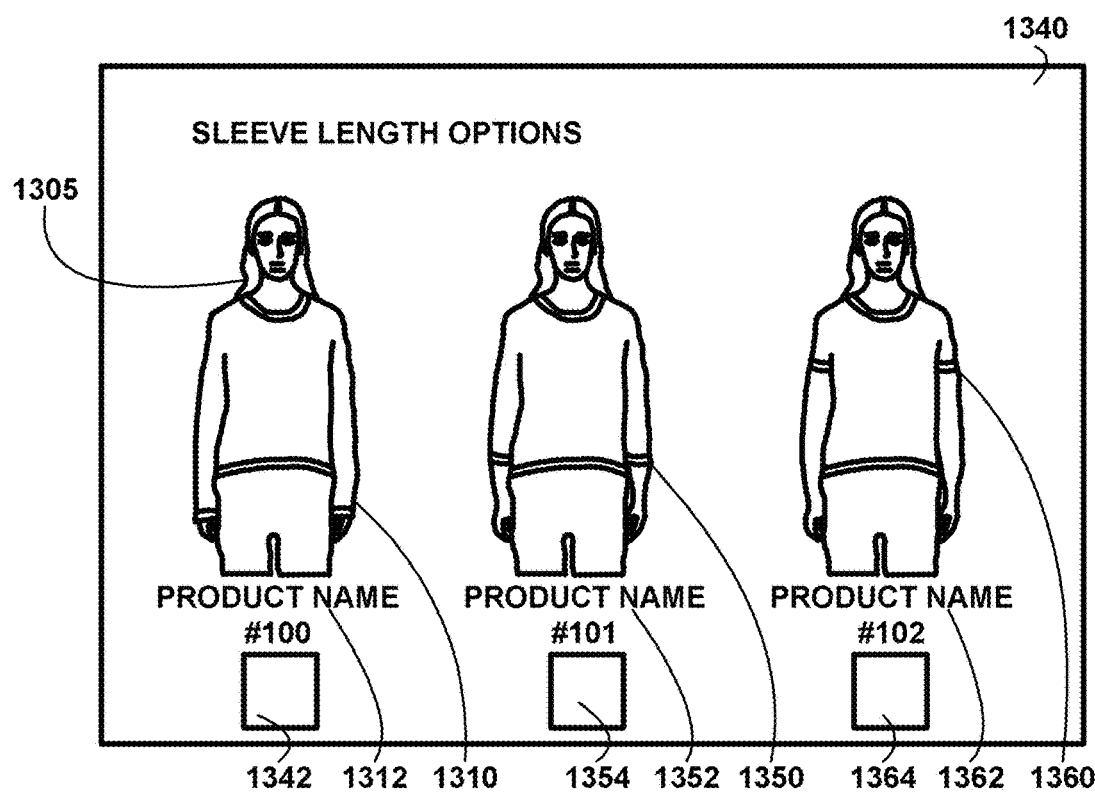

FIG. 11B illustrates an example of a feature of the knitted product selection that may be customized. The selected knitted product may include default features, such as colors, length, fit, stitch type, yarn type, and other features as described herein. In this embodiment, the sleeve length customization option page 1340 is shown. In this example the sleeve length customization selection page 1340 displays apparel style #100, a long sleeve 1310, on a model, such as a user rendition 1305 with selection box 1342. Sleeve length customization selection page 1340 shows apparel style #101 with a ¾ sleeve 1350 with selection box 1354, or a style #102 short sleeve 1360 with selection box 1364. Any other sleeve customization may be selected by the user including, for example, a sleeveless customization, not shown, according to an embodiment.

Figure 12A:
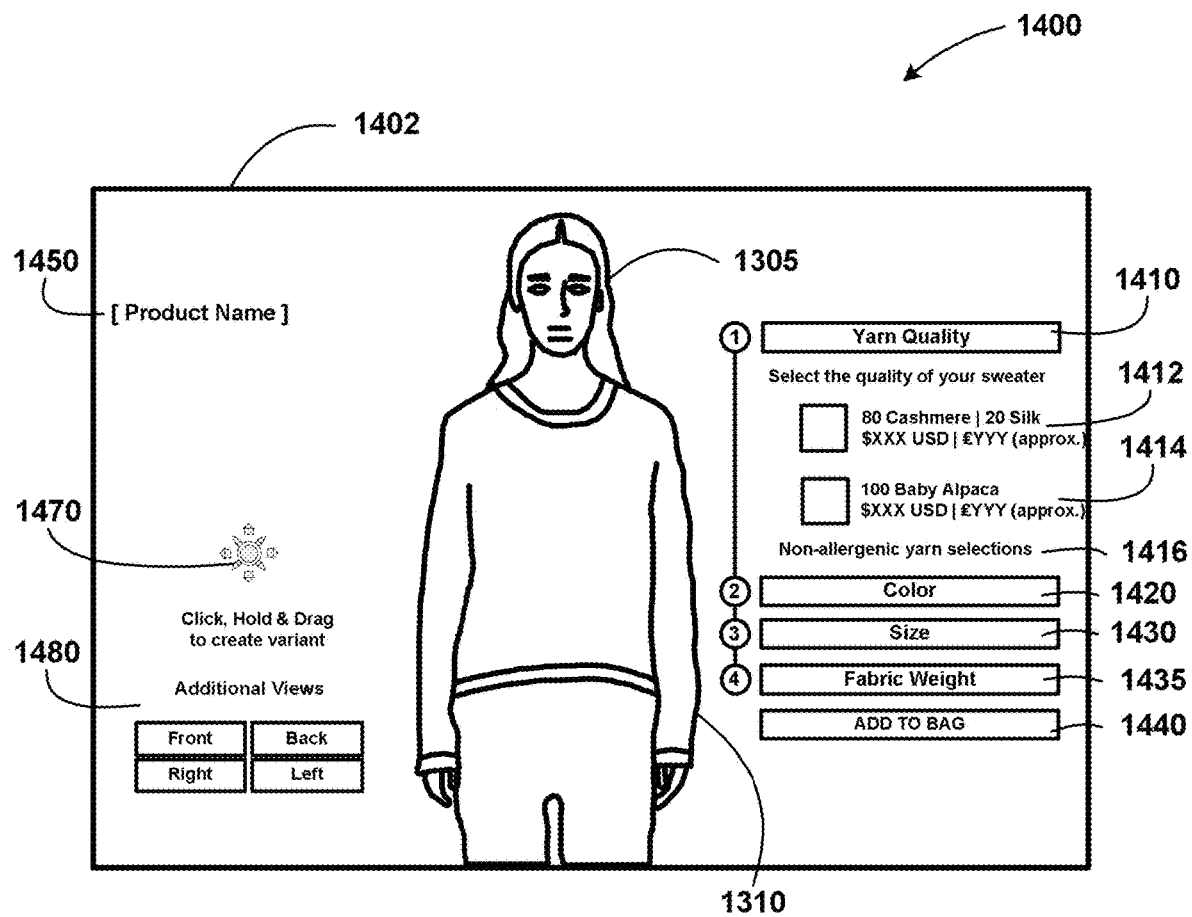

FIG. 12A illustrates an example of the customization selection page 1400 for style 1310, according to an embodiment. The customization selection page 1400 may include default values from the designer and the scanned rendition of the user in the customization features. Some or all of these default values may be changed by the user as desired. For example, there may be a default yarn quality 1410, a default color 1420, a default size 1430, and a default fabric weight 1435. There may be other default selections of features that may be customized as well that are not shown in this figure, such as finishing features or details, such as a design or embroidery.

FIG. 12A illustrates customized selections available for yarn quality 1410 for the apparel style #100 1310 selected by the consumer. The consumer may be presented with the designer default option and/or alternative choices to select. In this embodiment, the quality of the yarn may be selected including, for example, 80% cashmere|20% silk $xxx USD| £ yyy (approx) at button 1412, including a selection box. The designer may limit the selections available if desired. Another selection choice may include 100% baby alpaca $xxx USD| £ yyy (approx) at button 1414, including a selection box. The yarn quality customization selection may include non-allergenic yarn selections 1416, selections not shown, for those consumers who have fabric material allergies to wool, for example, according to an embodiment. After the consumer chooses the selection or feature for the knitted product, in one embodiment, the selection may be reflected in the knitted product on the avatar body 1305.

FIG. 12A shows other selection sections that include color 1420, size 1430, and fabric weight 1435. A selection to add to bag 1440 is used for ordering a consumer garment with customizations. Also shown on the page 1402 is the product name 1450 and a style description 1460:

"Long sleeve wool sweater striped in black and navy. Rib knit crewneck collar, cuffs, and hem in black. Knit jacquard design in dark tones. Diagonal seam at front and back. Asymmetric hem."

The user may select icon 1470 to click on a customizable detail, design, panel, or feature to drag the feature, design, panel or detail over or onto the knitted product, as desired. The icon 1470 may also be used for scaling the customization, according to user desire. After the consumer chooses the selection or feature for the knitted product, in one embodiment, the selection may be reflected in the knitted product on the avatar body 1305.

Viewing icons 1480 are available for the user to see all views of the knitted product, as customized, including a 360 degree view. The user may to create additional views including front, back, right and left, according to an embodiment.

Figure 12B:
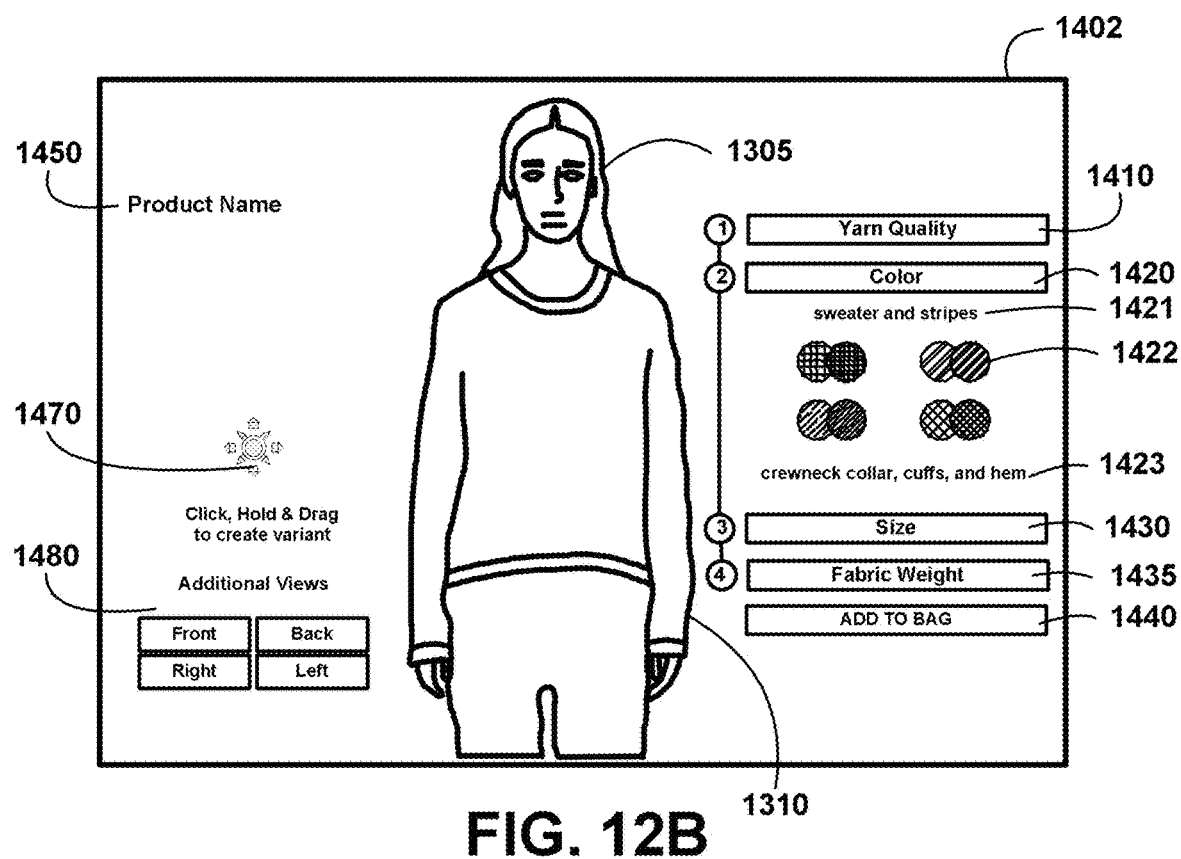

FIG. 12B illustrates an example of a color selection page 400 according to an embodiment. Shown is the consumer selected apparel style #100 1310. The consumer can select different colors, other than a default color scheme, for the selected apparel style #100 1310 with the yarn quality 1410 customization selected. There may be different colors for different yarn types or quality. Customizations for color 1420 include colors for a sweater and stripes 1421 including base and complimentary color selections 1422 and additional different colors for garment trim elements including crewneck collar, cuffs, and hem 1423 colors, if the consumer desires. After the consumer chooses the selection or feature for the knitted product, in one embodiment, the selection may be reflected in the knitted product on the avatar body 1305.

Figure 12C:
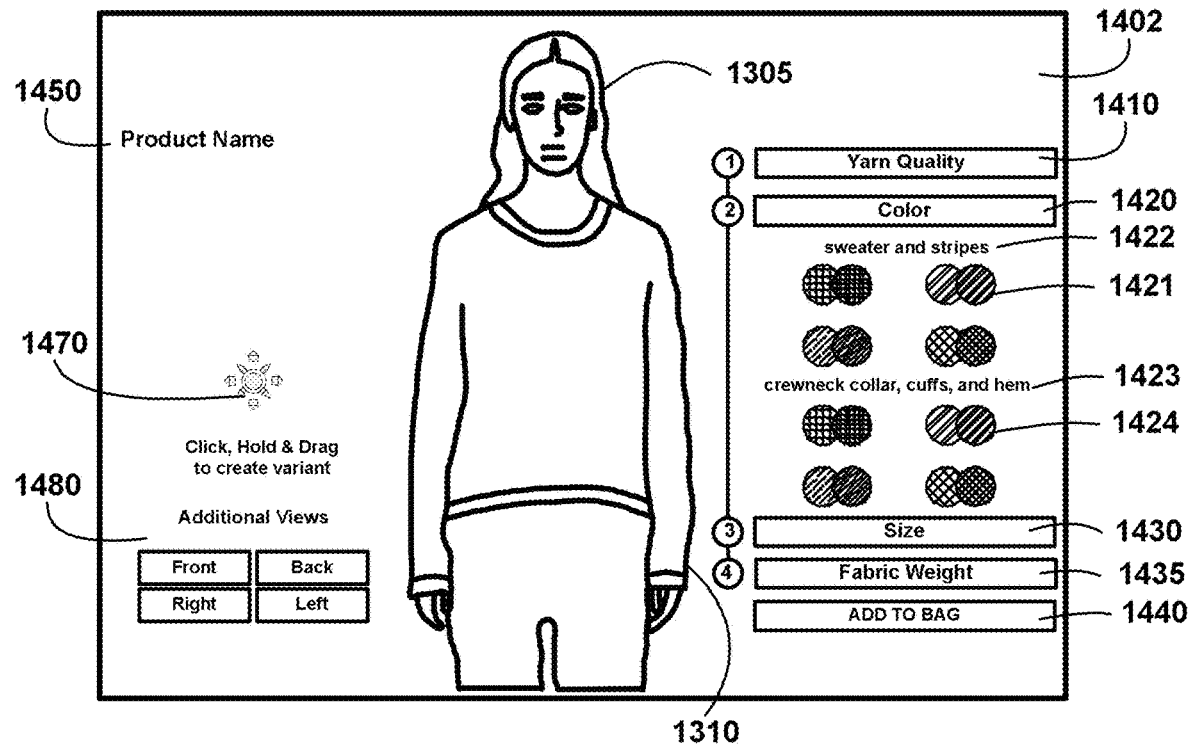

FIG. 12C illustrates an example of trim color selections 1402 according to an embodiment. The trim color selections 1402 are for the consumer style selection apparel style #100 1310. The yarn quality 1410 and color 1420 selections for sweater and stripes 1421, including default base and complimentary color selections 1422, are available. The crewneck collar, cuffs, and hem trim color selections 1423 include crewneck collar, cuffs, and hem trim color selections 1424. The trim color selections may be limited by yarn type, yarn quality, and colors previously selected. After the consumer chooses the selection or feature for the knitted product, in one embodiment, the selection may be reflected in the knitted product on the avatar body 1305.

Figure 12D:
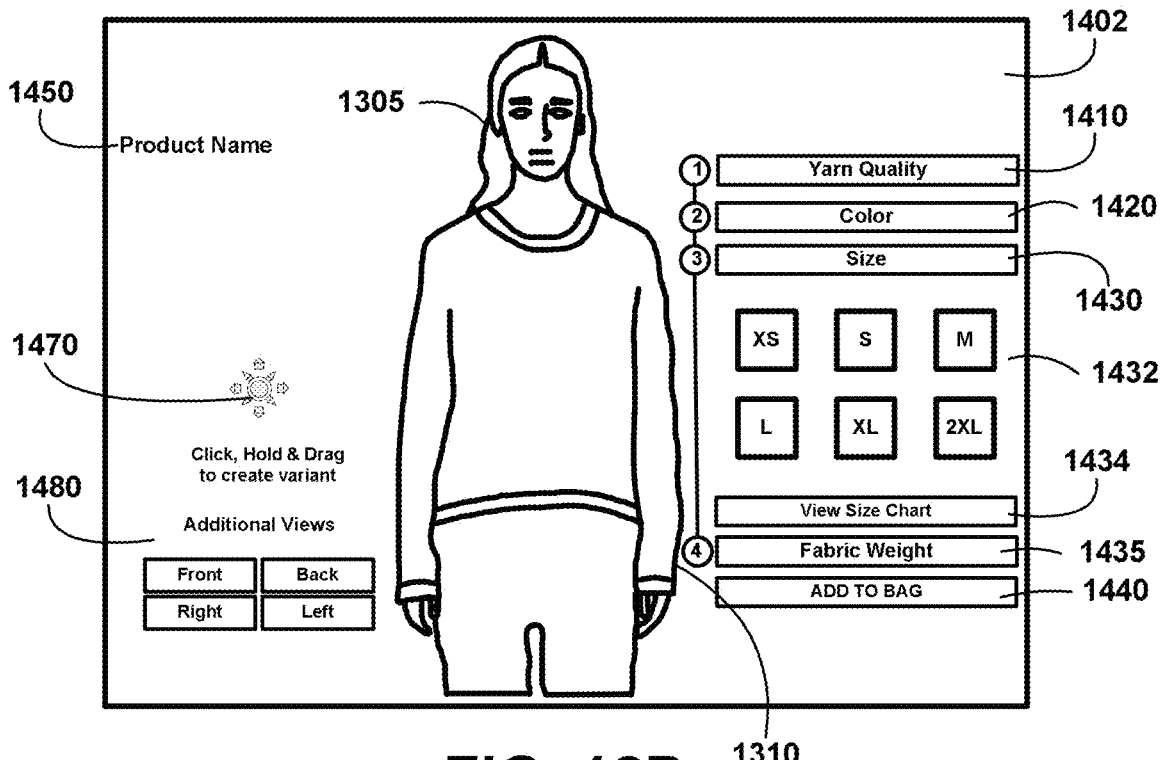

FIG. 12D illustrates an example of size selection page 1400 according to an embodiment. Consumer customizations in addition to yarn quality 1410 and color 1420 include the size 1430 customizations for the apparel style #100 1310. The size and fit of the knitted product may have default selections predetermined by the designer or design style. However, the user may select different sizes as desired. Size selections 1432 may include, but are not limited to, XS, S, M, L, XL AND 2XL. The consumer may wish to view size chart 1434 to clearly understand size equivalents. After the consumer chooses the selection or feature for the knitted product, in one embodiment, the selection may be reflected in the knitted product on the avatar body 1305.

Figure 12E:
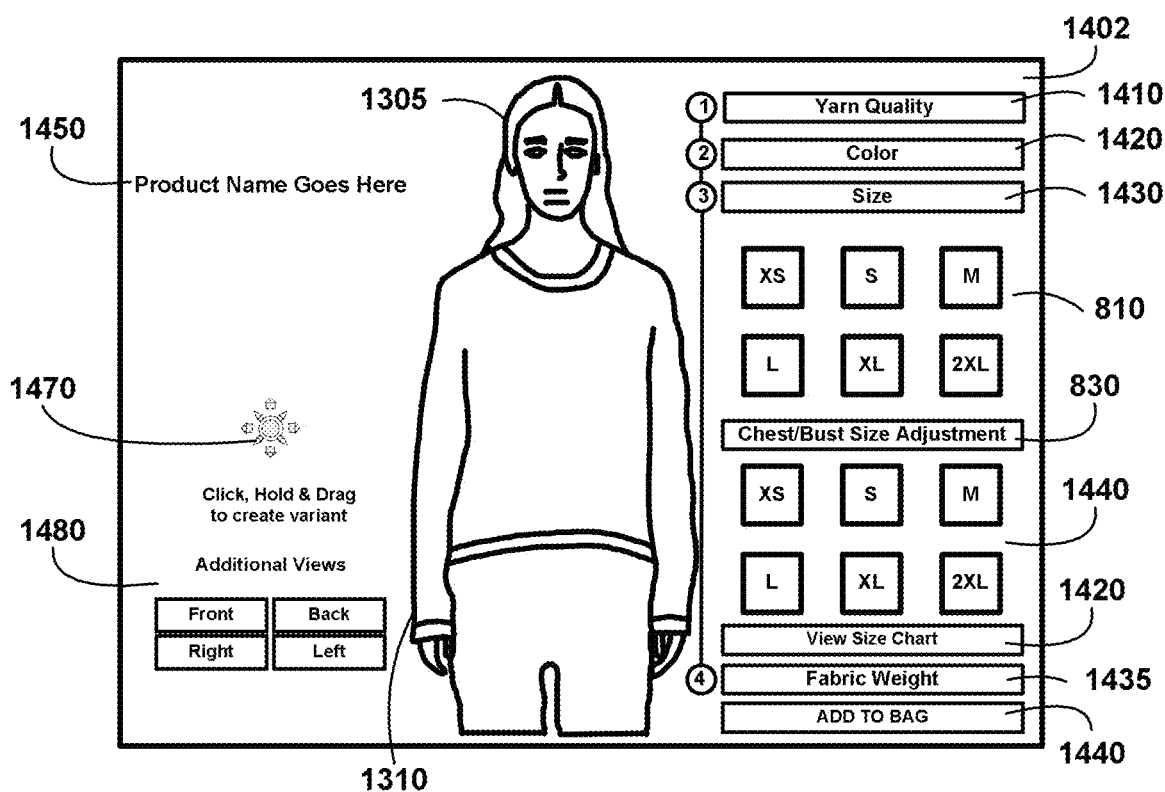

FIG. 12E illustrates an example of chest/bust size adjustment page 1402 according to an embodiment. The scan, as described herein, may give the user a default chest/bust size. However, the consumers may adjust the fit. Size customizations can include a broader body type, for example the athletic male who has a larger chest but narrow waist, women with larger bust to waist proportions, to create a customization that affords them a more tapered fit rather than having to select larger sizes to accommodate the top while being baggy around the waist. The consumer may also select a chest/bust size adjustment 1438. Chest/bust size adjustment selections 1439 may include XS, S, M, L, XL AND 2XL and the consumer may wish to view size chart 1434 to check sizing equivalents. After the consumer chooses the chest size adjustment, in one embodiment, the adjustment may be reflected in the avatar body 1305.

Figure 12F:
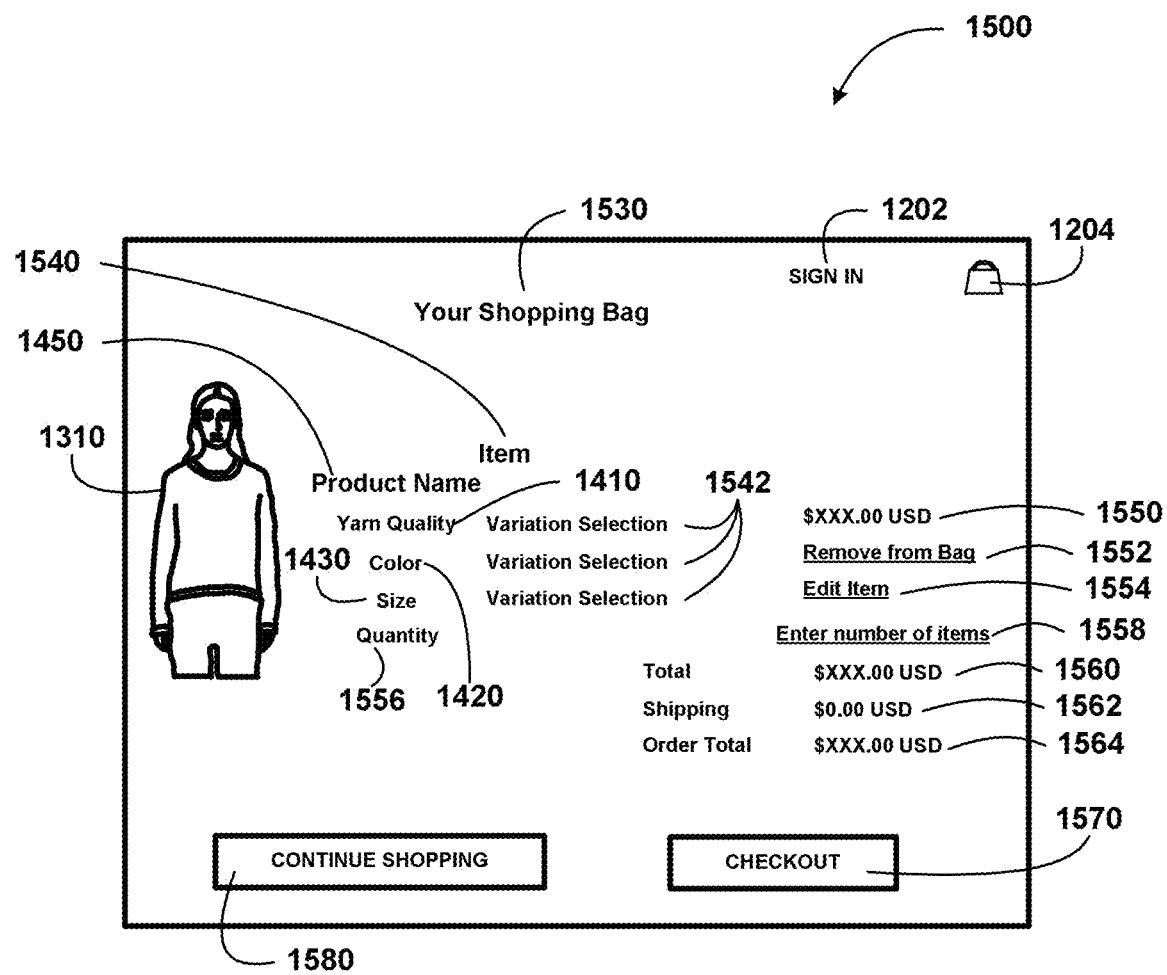

FIG. 12F illustrates an example of shopping bag page 1500 according to an embodiment. The shopping bag page 1500 includes the sign in 402 and shopping bag icon 404. A shopping bag 1530 page displays the apparel style #100 1310 under item 1540, a product name 1541, in this example product name #100 1312, and a customization selection 1542 for yarn quality 1410, color 1420, and size 1430 for each consumer customization selection. The shopping bag page 1500 also provides a quantity 1556 selections where the consumer can enter number of items 1558 for a particular selection for example a group wanting to dress alike. The shopping bag page 1500 displays an item price $xxx.00 USD 1550. The consumer is given the opportunity to remove from bag and/or edit item. A total $xxx.00 USD 1560 for the garment including shipping $0.00 USD 1562 and an order total $xxx.00 USD 1564. The consumer can select to checkout 1570 and also to continue shopping 1580 according to an embodiment.

FIG. 13A illustrates an example of order placement page 1600 according to an embodiment. The order page 1600 that includes the login selection 402 and the shopping bag icon 404. An ordering status is shown that includes account 1620, checkout 1622 and confirmation 1624 for consumer awareness of the current ordering position. The place order page 1600 automatically populates the display with the product name 1450, yarn quality 1410, color 1420, size 1430 and customization selection 1542 for each. The place order page 1600 is also showing the prices, consumer personal data, which is populated from the recorded consumer account data. Input areas are available for consumer payment data 1650 including a country dropdown entry 1630 and state or province dropdown entry 1640. When completed the consumer can select to place order 1610 according to an embodiment.

Figure 13B:
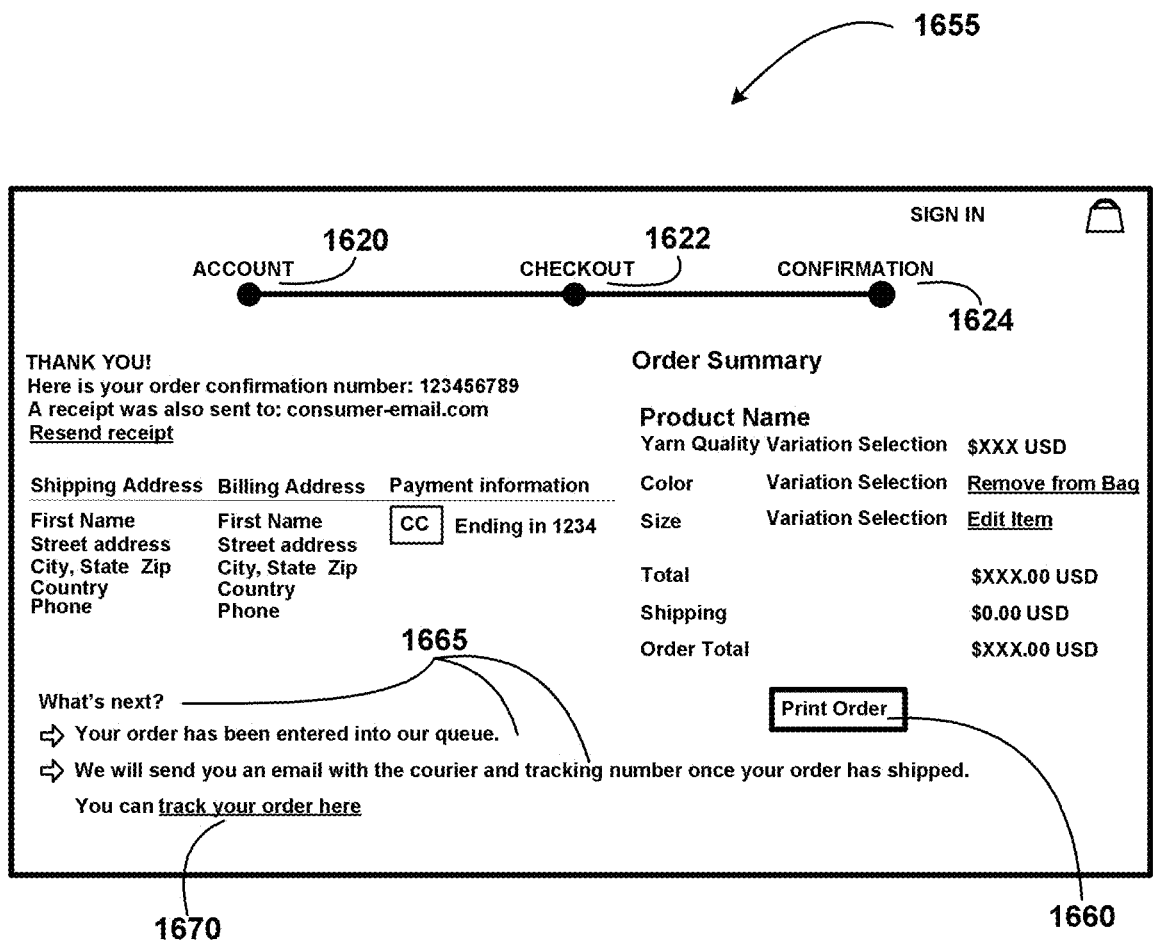

FIG. 13B shows a block diagram of an overview of order confirmation page 1655 according to an embodiment. The order confirmation page 1655 also shows the sign in 402, shopping bag icon 404 and ordering status account 1620, checkout 1622, and confirmation 1624. The order confirmation page 1655 is showing the consumer payment data populated with account data. The consumer may select to print order 1660. The order confirmation page 1655 also provides consumer guidance on what's next? 1665 including your order has been entered into our queue and we will send you an email with the courier and tracking number once your order has shipped. The consumer may select to track the order at 1670 to follow the order status according to an embodiment.

Figure 13C:
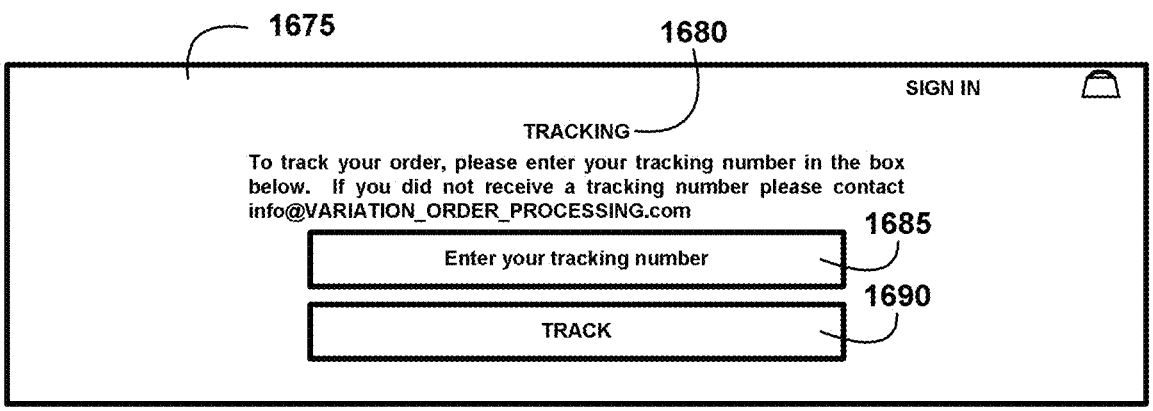

FIG. 13C illustrates an example of order tracking page 1675 according to an embodiment. The order-tracking page 1675 provides the consumer the opportunity of tracking their order. The consumer may enter the tracking number at button 1685 and select track 1690 to receive a current status of the order according to an embodiment.

Figure 13D:
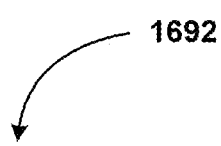

FIG. 13D illustrates an example of order history page 1692 according to an embodiment. The order history page 1692 displays previous orders including any current order that has been placed showing an order no. 1694, order date 1696, total 1697, and status 1698 according to an embodiment.

Figure 14A:
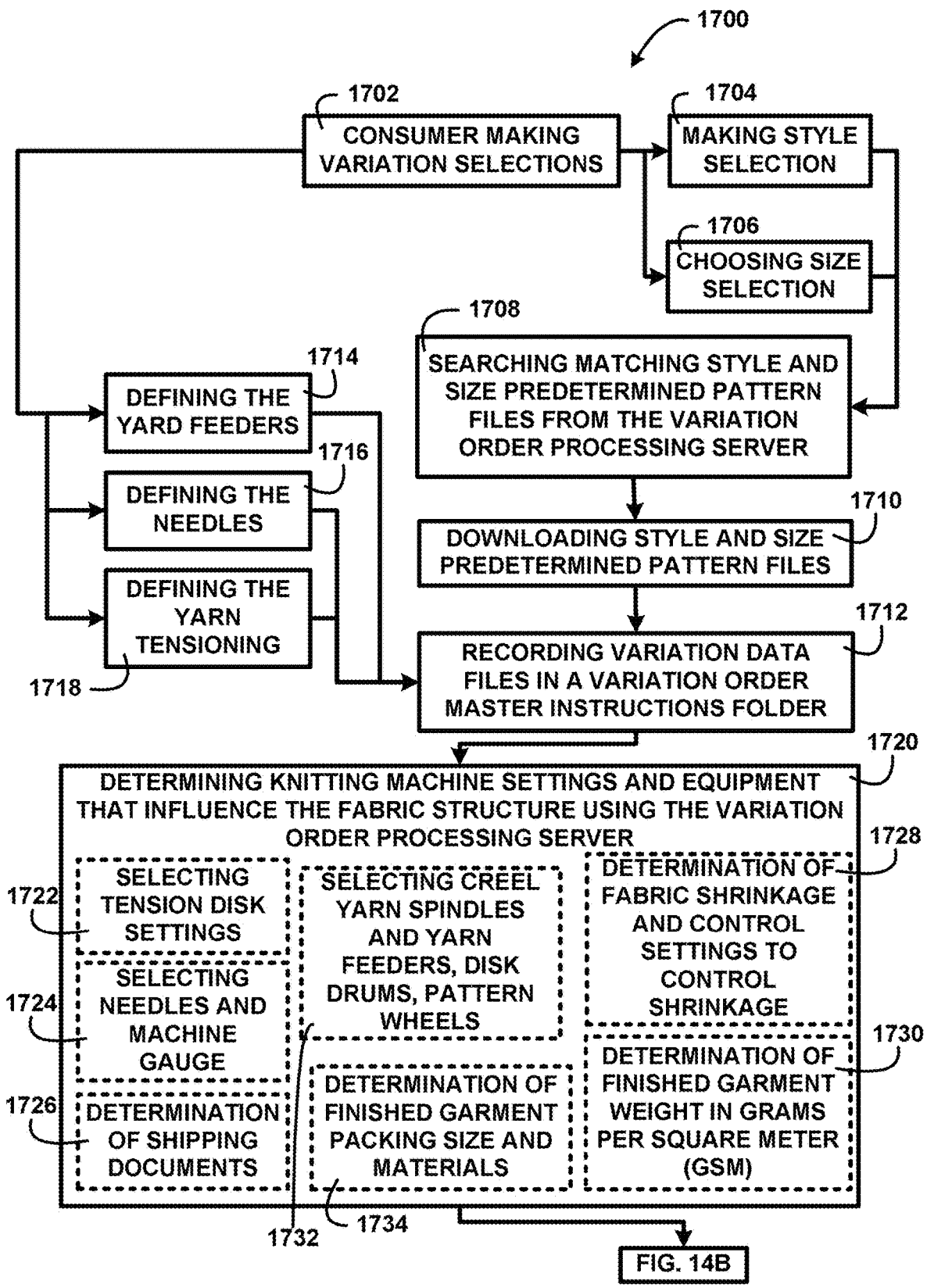
FIGS. 14A and 14B illustrate an example of customization processing according to an embodiment.

FIG. 14A illustrates an example of consumer customizations process 1700 according to an embodiment. The process includes a consumer making customizations at 1702. The consumer making style selection 1704 and choosing size selection 1706 begins the order processing with searching matching style and size predetermined pattern files from the order-processing server at 1708. Downloading style follows the style and size search and size predetermined pattern files at 1710, and recording customization data files in an order master instructions folder at 1712.

After customization selections are made at 1702, the yarn feeders are defined at 1714, as are the needles at 1716. The yarn tensioning is defined at 1718, according to embodiments. These customization data files are recorded in a order master instructions folder at 1712. The customization data files are used for determining knitting machine settings and equipment that influence the fabric structure using the order-processing server.

The order processing server calculates and processes data for selecting tension disk settings at 1722, selecting needles and machine gauge at 1724, selecting creel yarn spindles and yarn feeders, disk drums, and pattern wheels at 1732. The order processing server 110 calculates and processes data for determination of fabric shrinkage and control settings to control shrinkage at 1728, for determination of finished garment weight in grams per square meter (GSM) at 1730, for determination of finished garment packing size and materials at 1734, and for determination of shipping documents at 1726 according to an embodiment. The processing is further described in FIG. 14B.

Figure 14B:
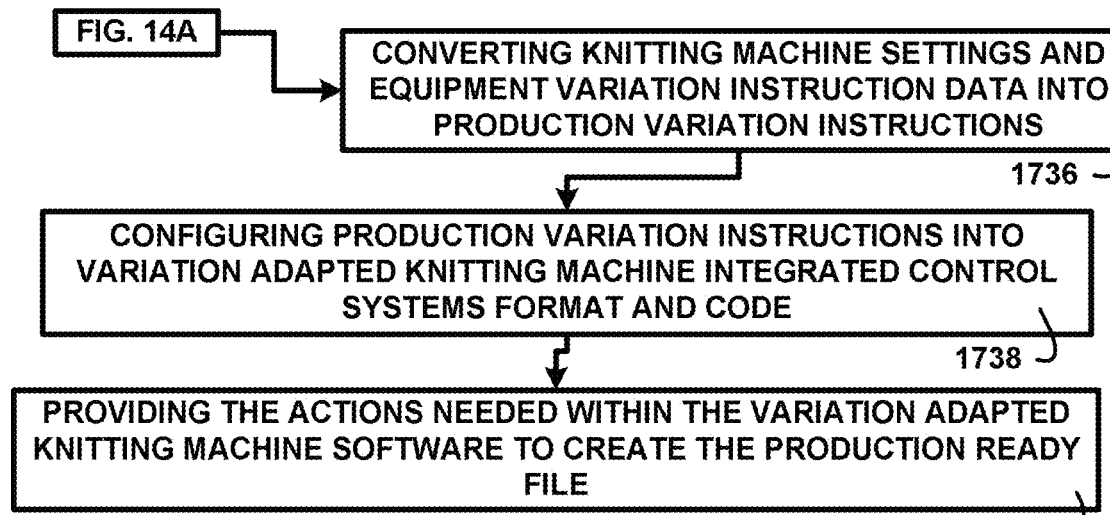

FIG. 14B illustrates the continued example of the integrated control system format and code according to an embodiment. The process may continue at converting knitting machine settings and equipment variation instruction data into production variation or customization instructions at 1736. The process then may configure production customization instructions into customization adapted knitting machine integrated control system format and code at 1738. The customization adapted knitting machine integrated control system format and code is providing the actions needed within the customization adapted knitting machine software to create the production ready file at 1740, according to an embodiment.

Figure 15:
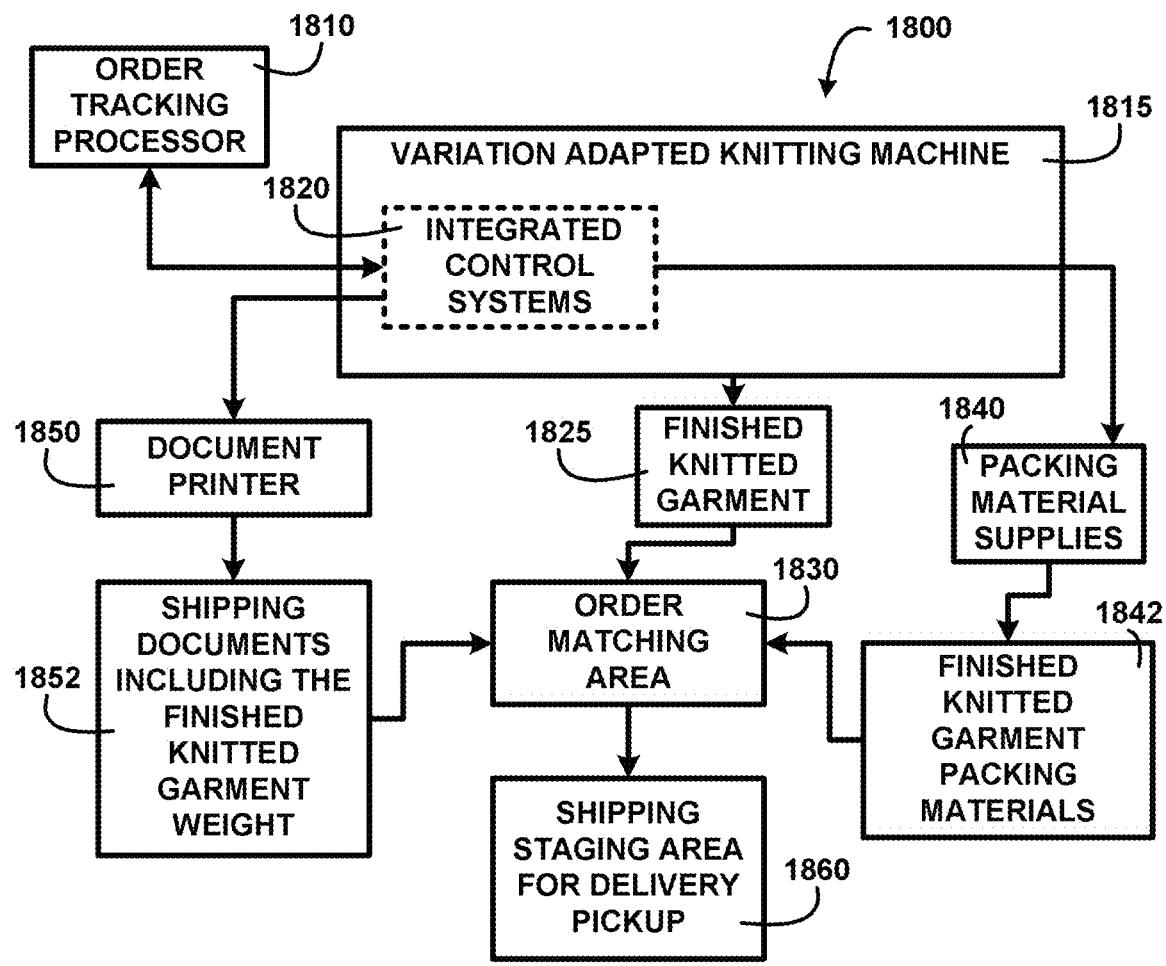
FIG. 15 illustrates an example of knitted product processing according to an embodiment.

FIG. 15 illustrates an example of finished customization garment processing flow chart 1800 according to an embodiment. The order tracking processor 1810 may transmit processing data to the integrated control system 1820. The integrated control system 1820 instructs customization adapted knitting machine 1815 on the actions needed within the customization adapted knitting machine to create the consumer selected customization garment. The knitted garment when completed is conveyed through a finished knitted garment outlet from the knitting machine 1815. A finished knitted garment 1820 can be manually or automatically conveyed to an order matching area 1830. The order tracking processor 1810 upon knitted garment production completion instructs the integrated control system 1820 on the packing material supplies 1840 that have been determined. Finished knitted garment packing materials 1842 can be manually or automatically conveyed to the order matching area 1830. The order tracking processor 1810 can instruct the integrated control system 1820 with a coupled document printer 1850 to print shipping documents including the finished garment weight 1852. The printed shipping documents can manually or automatically be conveyed to the order matching area 1830. The completed finished garment packing and shipping documentation is followed by manually or automatically conveyed the finished knitted garment package to a shipping staging area for delivery pick-up 1860 according to an embodiment.

In another embodiment the finished knitted garment 1820 can be folded using an automatic folding device. The finished knitted garment 1820 can be wrapped and placed in for example a packing box automatically using an automated packing device. The shipping documents including the finished knitted garment weight 1852 can be affixed to the shipping package automatically and automatically placed on for example a conveying device and conveyed to the shipping staging area for delivery pick-up 1860.

FIG. 8 shows a knitted textile consumer Internet device logged into customization Internet site 1000 including a knitted textile consumer internet device logged into variation website 1002 using a knitted products customization ecommerce Internet application 1004.

Figure 16:
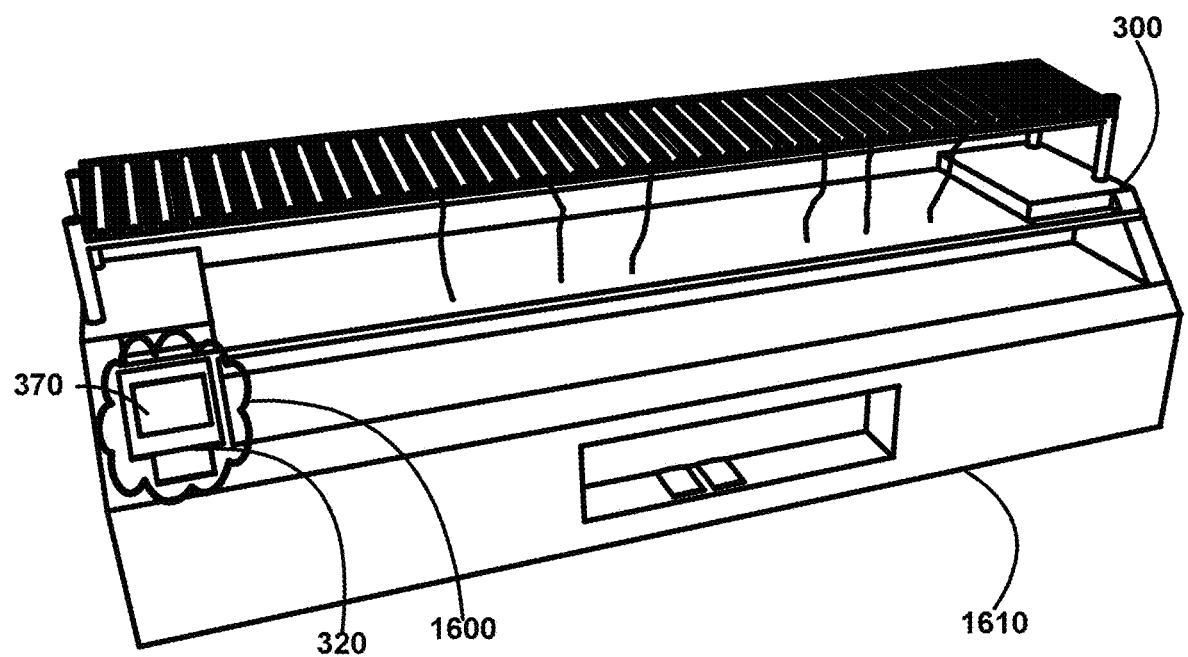
FIG. 16 illustrates an example of an integrated control systems adaptation device according to an embodiment.

FIG. 16 illustrates an example of an integrated control systems adaptation device according to an embodiment. FIG. 16 shows the knitting machine 300 with the integrated control system 320 and the monitor 370. The integrated control system 320 and the monitor 370 are integrated into a case to create an integrated control systems adaptation device 1600. The integrated control systems adaptation device 1600 can be paired with the knitting machine 300 to create a variation adapted knitting machine 1610 of one embodiment.

In one embodiment an apparatus includes at least one variation order processing server 1010 is configured to include at least one communication device coupled to at least one knitted textile consumer variation website 1002, at least one production variation instruction data converter processor 1042, at least one variation adapted knitting machine integrated control systems 1050, at least one order tracking processor 1030, at least one internet communication device 1006, a thermal scanner, and at least one integrated control systems adaptation device 1600, and at least one integrated knitted textiles variation ecommerce web application 1102 is configured to be coupled to at least one consumer internet communication device 1006 for communicating with the at least one knitted textile consumer variation website 1002. The at least one variation order processing server 1010 is configured for determining a size predetermined pattern fit using a thermal scanned image heat signature outline of the entity overlaid in a display with the knitted garment size selection for a consumer to make a final size selection, and configured for searching style and size predetermined pattern files matching consumer style and variation selections, downloading and recording matching style and size predetermined pattern files and variation data files in a variation order master instructions folder. The at least one variation order processing server 1010 is configured for calculating and processing variation selection data for defining, selecting and determining variation adapted knitting machine 1610 production equipment and settings. The at least one communication device is configured to include a desktop computer, and a wireless communication device 1120 including a laptop computer, smart phone, and a tablet. The at least one knitted textile consumer variation website 1002 is configured for processing variation knitted garment orders and production. The at least one production variation instruction data converter processor 1042 is configured for converting consumer variation selections into adapted knitted machine instructions. The at least one variation adapted knitting machine integrated control systems 1050 is configured for integration into at least one integrated control systems adaptation device 1600 for adapting multiple types knitting machines CNC accessories paired with the integrated control systems 1050 to create one or more variation adapted knitting machine 1610, wherein the at least one variation adapted knitting machine integrated control systems 1050 is configured for receiving and transmitting converted consumer style and variation selections production variation instruction data coded operating instructions to a variation adapted knitting machine 1610 for production of variation finished knitted garments. The at least one order tracking processor 1030 is configured for tracking and sequencing variation order processing throughout the production processing including placing the order on a production queue, transmitting production instructions to a variation adapted knitting machine 1610 when the variation order reaches top position on the production queue. The at least one order tracking processor 1030 is configured for transmitting packing instructions when a production completion signal is received, transmitting shipping instructions when a packing completion signal is received and recording a courier tracking number when an order shipped signal is received. The at least one integrated knitted textiles variation ecommerce web application 1102 is configured for consumer use in selecting knitted garment variations and ordering on the knitted textile consumer variation website 1002.

In another embodiment an apparatus includes at least one production variation instruction data converter processor 1042 is configured to be coupled to at least one variation order processing server 1010 for converting production variation instructions into adapted knitted machine instructions. The at least one production variation instruction data converter processor 1042 is configured for converting consumer variation selections scan into adapted knitted machine instructions including integrated control systems format and code 1154. The at least one production variation instruction data converter processor 1042 is configured for converting consumer variation selections into adapted knitted machine instructions including actions needed within variation adapted knitting machine software including calculating and processing variation selection data for defining, selecting and determining variation adapted knitting machine 1610 production equipment and settings including creel yarn spindles and yarn feeders, needles, yarn tensioning, tension disk settings, machine gauge, disk drums, pattern wheels, fabric shrinkage and control settings to control shrinkage and recording results in a variation order master instructions folder to create a production ready file. The at least one production variation instruction data converter processor 1042 is configured for calculating and processing variation selection data for defining, selecting and determining a variation finished knitted garment weight in grams per square meter and a shipping weight in pounds, a variation finished knitted garment packing size and materials and a variation finished knitted garment shipping documents. The at least one variation order processing server 1010 is configured for receiving and processing consumer selections of knitted garment variations and orders from a knitted textile consumer variation website 1002.

In yet another embodiment an apparatus includes at least one integrated control systems adaptation device 1600 is configured to include at least one integrated control systems 1050 and configured to be coupled with at least one adapted knitting machine 1610 for operating according to adapted knitted machine instructions to produce a consumer selected variations knitted garment. The at least one integrated control systems adaptation device 1600 is configured to include at least one integrated control systems including at least one variation adapted knitting machine integrated control systems 1050. The at least one integrated control systems adaptation device 1600 is configured for adapting multiple types knitting machines CNC accessories paired with the at least one integrated control systems to create one or more variation adapted knitting machine 1610. The at least one integrated control systems adaptation device 1600 is configured to include at least one integrated control systems, wherein the at least one integrated control systems is configured for receiving and transmitting converted consumer style and variation selections production variation instruction data coded operating instructions to a variation adapted knitting machine 1610 for production of variation finished knitted garments. The at least one integrated control systems adaptation device 1600 is configured to include at least one integrated control systems, wherein the at least one integrated control systems is configured to include adapted knitted machine instructions including actions needed within one or more variation adapted knitting machine software including variation selection data for defining, selecting and determining variation adapted knitting machine 1610 production equipment and settings.

The illustrations of embodiments described herein are intended to provide a general understanding of the structure of various embodiments, and they are not intended to serve as a complete description of all the elements and features of apparatus and systems that might make use of the structures described herein. Many other embodiments may be apparent to those of skill in the art upon reviewing the description herein. Other embodiments may be utilized and derived therefrom, such that structural and logical substitutions and changes may be made without departing from the scope of this disclosure.

FIGS. 1 to 15 are merely example embodiments and may not be drawn to scale. Certain proportions thereof may be exaggerated, while others may be minimized. Accordingly, the specification and drawings are to be regarded in an illustrative rather than a restrictive sense.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. § 1.74(b) to allow the reader to quickly ascertain the nature and gist of the technical disclosure. The Abstract is submitted with the understanding that it may not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features that are expressly recited in each claim. Thus the following claims are hereby incorporated into the Detailed Description, with each claim standing on its own as a separate embodiment.

Thus, embodiments describe a knitting method and system. Although embodiments have been described with reference to specific examples, it may be evident that various modifications and changes may be made to these examples without departing from the broader spirit and scope of embodiments described herein.

What is claimed is:

1. An apparatus, comprising:
at least one variation order processing server is configured to include at least one communication device coupled to at least one knitted textile consumer variation website, at least one production variation instruction data converter processor, at least one variation adapted knitting machine integrated control systems, at least one order tracking processor, at least one internet communication device, a thermal scanner, and at least one integrated control systems adaptation device; and;
at least one integrated knitted textiles variation ecommerce web application is coupled to at least one consumer internet communication device for communicating with the at least one knitted textile consumer variation website.

2. The apparatus of claim 1, wherein the at least one variation order processing server is configured for determining a size predetermined pattern fit using a thermal scanned image heat signature outline of the entity to provide a rendition of the user overlaid in a display with the knitted garment size selection for a consumer to make a final size selection to create at least one production variation instructions, and configured for searching style and size predetermined pattern files matching consumer style and variation selections, downloading and recording matching style and size predetermined pattern files and variation data files in a variation order master instructions folder.

3. The apparatus of claim 1, wherein the at least one variation order processing server is configured for calculating and processing variation selection data for defining, selecting and determining variation adapted knitting machine production equipment and settings.

4. The apparatus of claim 1, the at least one communication device is configured to include a desktop computer, and a wireless communication device including a laptop computer, smart phone, and a tablet.

5. The apparatus of claim 1, the at least one knitted textile consumer variation website is configured for processing variation knitted garment orders and production.

6. The apparatus of claim 1, the at least one production variation instruction data converter processor is configured for converting consumer variation selections into adapted knitted machine instructions.

7. The apparatus of claim 1, the at least one variation adapted knitting machine integrated control systems is configured for integration into at least one integrated control systems adaptation device for adapting multiple types knitting machines CNC accessories paired with the integrated control systems to create one or more variation adapted knitting machine, wherein the at least one variation adapted knitting machine integrated control systems is configured for receiving and transmitting converted consumer style and variation selections production variation instruction data coded operating instructions to a variation adapted knitting machine for production of variation finished knitted garments.

8. The apparatus of claim 1, the at least one order tracking processor is configured for tracking and sequencing variation order processing throughout the production processing including placing the order on a production queue, transmitting production instructions to a variation adapted knitting machine when the variation order reaches top position on the production queue.

9. The apparatus of claim 1, the at least one order tracking processor is configured for transmitting packing instructions when a production completion signal is received, transmitting shipping instructions when a packing completion signal is received and recording a courier tracking number when an order shipped signal is received.

10. The apparatus of claim 1, the at least one integrated knitted textiles variation ecommerce web application is configured for consumer use in selecting knitted garment variations and ordering on the knitted textile consumer variation website.

11. The apparatus of claim 1, wherein the at least one variation order processing server is configured for receiving and processing consumer selections of knitted garment variations and orders from a knitted textile consumer variation website.

12. An apparatus, comprising:
at least one production variation instruction data converter processor is coupled to at least one variation order processing server for converting production variation instructions into adapted knitted machine instructions;
a thermal scanner coupled to the at least one variation order processing server for determining a size predetermined pattern fit using a thermal scanned image heat signature outline used to provide a rendition of the user for the production variation instructions;
at least one integrated control systems adaptation device coupled to the at least one variation order processing server for receiving adapted knitted machine instructions; and
at least one variation adapted knitting machine coupled to the at least one integrated control systems adaptation device for receiving the adapted knitted machine instructions from the at least one integrated control systems adaptation device and implementing variation adapted knitting machine functions according to the adapted knitted machine instructions.

13. The apparatus of claim 12, wherein the at least one production variation instruction data converter processor is configured for converting consumer variation selections scan into adapted knitted machine instructions including integrated control systems format and code.

14. The apparatus of claim 12, wherein the at least one production variation instruction data converter processor is configured for converting consumer variation selections into adapted knitted machine instructions including actions needed within variation adapted knitting machine software including calculating and processing variation selection data for defining, selecting and determining variation adapted knitting machine production equipment and settings including creel yarn spindles and yarn feeders, needles, yarn tensioning, tension disk settings, machine gauge, disk drums, pattern wheels, fabric shrinkage and control settings to control shrinkage and recording results in a variation order master instructions folder to create a production ready file.

15. The apparatus of claim 12, wherein the at least one production variation instruction data converter processor is configured for calculating and processing variation selection data for defining, selecting and determining a variation finished knitted garment weight in grams per square meter and a shipping weight in pounds, a variation finished knitted garment packing size and materials and a variation finished knitted garment shipping documents.

16. An apparatus, comprising:
at least one integrated control systems adaptation device includes at least one integrated control system and is coupled to at least one variation adapted knitting machine;
at least one variation order processing server coupled to at least one production variation instruction data converter processor for converting production variation instructions into adapted knitted machine instructions and is configured for transmitting the adapted knitted machine instructions to the at least one integrated control systems adaptation device;
a thermal scanner coupled to the at least one variation order processing server for determining a size predetermined pattern fit using a thermal scanned image heat signature outline used to provide a rendition of the user for the production variation instructions;
wherein the at least one integrated control systems adaptation device is configured for receiving adapted knitted machine instructions from the at least one variation order processing server; and
wherein the at least one variation adapted knitting machine coupled to the at least one integrated control systems adaptation device is configured for receiving from the at least one integrated control system the adapted knitted machine instructions for implementing the adapted knitted machine instructions for producing a consumer selected variations knitted garment.

17. The apparatus of claim 16, wherein the at least one integrated control systems adaptation device is configured to include at least one integrated control systems including at least one variation adapted knitting machine integrated control systems.

18. The apparatus of claim 16, wherein the at least one integrated control systems adaptation device is configured for adapting multiple types knitting machines CNC accessories paired with the at least one integrated control systems to create one or more variation adapted knitting machine.

19. The apparatus of claim 16, the at least one integrated control systems adaptation device is configured to include at least one integrated control systems, wherein the at least one integrated control systems is configured for receiving and transmitting converted consumer style and variation selections production variation instruction data coded operating instructions to a variation adapted knitting machine for production of variation finished knitted garments.

20. The apparatus of claim 16, the at least one integrated control systems adaptation device is configured to include at least one integrated control systems, wherein the at least one integrated control systems is configured to include adapted knitted machine instructions including actions needed within one or more variation adapted knitting machine software including variation selection data for defining, selecting and determining variation adapted knitting machine production equipment and settings.

* * * * *